(12) United States Patent
Takamoto et al.

(10) Patent No.: US 7,937,615 B2
(45) Date of Patent: May 3, 2011

(54) METHOD FOR IMPROVING RELIABILITY OF MULTI-CORE PROCESSOR COMPUTER

(75) Inventors: Yoshifumi Takamoto, Kokubunji (JP); Toru Horie, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 434 days.

(21) Appl. No.: 11/729,948

(22) Filed: Mar. 30, 2007

(65) Prior Publication Data

US 2008/0148015 A1    Jun. 19, 2008

(30) Foreign Application Priority Data

Dec. 19, 2006    (JP) ................................. 2006-340673

(51) Int. Cl.
*G06F 11/00* (2006.01)
(52) U.S. Cl. ................................. 714/10; 714/1; 714/47
(58) Field of Classification Search ................ 714/1–57; 326/41; 360/77–78; 710/52; 717/127–135; 708/502; 711/202; 716/4–7; 709/217, 223, 709/248; 718/1
See application file for complete search history.

(56) References Cited

U.S. PATENT DOCUMENTS

| | | | |
|---|---|---|---|
| 6,442,627 B1 * | 8/2002 | Negishi et al. .................. 710/52 |
| 6,490,121 B1 * | 12/2002 | Pruett et al. ................. 360/78.09 |
| 6,519,634 B1 * | 2/2003 | Song et al. ..................... 709/220 |
| 7,210,111 B1 * | 4/2007 | Smith et al. ......................... 716/6 |
| 2002/0186043 A1 * | 12/2002 | Sihlbom et al. ................. 326/41 |
| 2003/0217088 A1 | 11/2003 | Takamoto |
| 2004/0003319 A1 | 1/2004 | Ukai et al. |
| 2004/0090913 A1 * | 5/2004 | Scudder et al. ................ 370/219 |
| 2004/0111708 A1 * | 6/2004 | Calder et al. ................... 717/131 |
| 2006/0136653 A1 | 6/2006 | Traut et al. |
| 2006/0156130 A1 * | 7/2006 | Huott et al. .................... 714/733 |
| 2006/0212677 A1 | 9/2006 | Fossum |
| 2006/0224858 A1 * | 10/2006 | Wang et al. .................... 711/202 |

(Continued)

FOREIGN PATENT DOCUMENTS

JP    2003-330740 A    11/2003

(Continued)

OTHER PUBLICATIONS

Japanese Office Action, w/ partial English translation thereof, issued in Japanese Patent Application No. JP 2006-340673 dated Apr. 8, 2009.

*Primary Examiner* — Scott T Baderman
*Assistant Examiner* — Sarai Butler
(74) *Attorney, Agent, or Firm* — McDermott Will & Emery LLP

(57) ABSTRACT

In a system including a plurality of multi-core processors, a table for managing the processors and cores owned by the processors is provided and a single virtual server is formed by using cores owned by different processors when generating the virtual server. According to the number owned by processors, the number of processors is varied. If a fault preecho in a processor is detected, control is exercised so as not to deliver an execution schedule of a virtualization mechanism to the processor in which the fault preecho has been detected. In a system including a plurality of multi-core processors, arithmetic cores owned by a plurality of different processors are assigned to processing of a process or thread in an operating system. In a system including a plurality of multi-core processors, arithmetic cores owned by a plurality of different processors are assigned to the operating system.

9 Claims, 29 Drawing Sheets

U.S. PATENT DOCUMENTS

| | | | |
|---|---|---|---|
| 2006/0288080 A1* | 12/2006 | Orszag et al. | 709/217 |
| 2007/0083586 A1* | 4/2007 | Luo et al. | 708/502 |
| 2007/0130426 A1* | 6/2007 | Utsumi | 711/130 |
| 2007/0266206 A1* | 11/2007 | Kim et al. | 711/118 |

FOREIGN PATENT DOCUMENTS

| | | |
|---|---|---|
| JP | 2004-30363 A | 1/2004 |
| JP | 2006-178933 A | 7/2006 |
| JP | 2006-260568 A | 9/2006 |

* cited by examiner

FIG. 5

SERVER CONFIGURATION TABLE /108

| SYSTEM ID (501) | PROCESSOR CONFIGURATION (502) | PROCESSOR TYPE (503) | MEMORY CAPACITY (504) | I/O DEVICE (505) | VIRTUALIZATION MECHANISM ID (506) |
|---|---|---|---|---|---|
| SMP 1 | PROCESSOR 1 | FOUR CORES | 16GB | NETWORK 1<br>NETWORK 2<br>DISK ADAPTER 1<br>DISK ADAPTER 2 | VIRTUALIZATION MECHANISM 1 |
|  | PROCESSOR 2 | FOUR CORES |  |  |  |
| SMP 2 | PROCESSOR 3 | EIGHT CORES | 32GB | NETWORK 1<br>NETWORK 2<br>NETWORK 3<br>DISK ADAPTER 1<br>DISK ADAPTER 2 | VIRTUALIZATION MECHANISM 2 |
|  | PROCESSOR 4 | EIGHT CORES |  |  |  |
|  | PROCESSOR 5 | EIGHT CORES |  |  |  |
|  | PROCESSOR 6 | EIGHT CORES |  |  |  |

FIG. 6

VIRTUALIZATION MECHANISM MANAGEMENT TABLE ~109

| VIRTUALIZATION MECHANISM ID (601) | VIRTUAL SERVER ID (602) | ASSIGNED PROCESSOR ID (603) | ASSIGNED CORE ID (604) | ASSIGNED MEMORY (605) | ASSIGNED I/O DEVICE (606) |
|---|---|---|---|---|---|
| VIRTUALIZATION MECHANISM 1 | VIRTUAL SERVER 1 | PROCESSOR 1 | CORE 1 | 4GB | NETWORK 1 DISK ADAPTER 1 |
| | | PROCESSOR 2 | CORE 1 | | |
| | VIRTUAL SERVER 2 | PROCESSOR 1 | CORE 2 | 8GB | NETWORK 2 DISK ADAPTER 2 |
| | | PROCESSOR 2 | CORE 2 | | |
| | RESOURCE POOL | PROCESSOR 1 | CORE 3 | 4GB | – |
| | | PROCESSOR 1 | CORE 4 | | |
| | | PROCESSOR 2 | CORE 3 | | |
| | | PROCESSOR 2 | CORE 4 | | |
| | | PROCESSOR 3 | CORES 1 TO 4 | | |
| | | PROCESSOR 4 | CORES 1 TO 4 | | |
| VIRTUALIZATION MECHANISM 2 | VIRTUAL SERVER 3 | PROCESSOR 3 | CORE 1 | 16GB | NETWORK 1 NETWORK 2 DISK ADAPTER 1 DISK ADAPTER 2 |
| | | PROCESSOR 4 | CORE 1 | | |
| | | PROCESSOR 5 | CORE 1 | | |
| | | PROCESSOR 6 | CORE 1 | | |
| | RESOURCE POOL | PROCESSOR 3 | CORES 2 TO 8 | 16GB | NETWORK 3 |
| | | PROCESSOR 4 | CORES 2 TO 8 | | |
| | | PROCESSOR 5 | CORES 2 TO 8 | | |
| | | PROCESSOR 6 | CORES 2 TO 8 | | |

PROCESSOR MANAGEMENT TABLE

| PROCESSOR ID | CORE ID | STATE |
|---|---|---|
| PROCESSOR 1 | CORE 1 | NORMAL |
| | CORE 2 | |
| | CORE 3 | |
| | CORE 4 | |
| PROCESSOR 2 | CORE 1 | FAULT PREECHO DETECTION CORE 3<br>FAULT CORE 4 |
| | CORE 2 | |
| | CORE 3 | |
| | CORE 4 | |
| PROCESSOR 3 | CORE 1 | FAULT PREECHO DETECTION SECONDARY CACHE |
| | CORE 2 | |
| | CORE 3 | |
| | CORE 4 | |
| | CORE 1 | |
| | CORE 2 | |
| | CORE 3 | |
| | CORE 4 | |
| PROCESSOR 4 | CORE 1 | NORMAL |
| | CORE 2 | |
| | CORE 3 | |
| | CORE 4 | |
| | CORE 1 | |
| | CORE 2 | |
| | CORE 3 | |
| | CORE 4 | |

FIG. 8

FAULT COUNTERACTION TABLE 111

| PROCESSOR CLASSIFICATION 801 | PROCESSOR REGION 802 | COUNTERACTION TO BE TAKEN WHEN FAULT PREECHO IS DETECTED 803 | COUNTERACTION TO BE TAKEN AT TIME OF FAULT 804 |
|---|---|---|---|
| PROCESSOR TYPE 1 | CORE | CORE ALTERNATION VIRTUAL MECHANISM SCHEDULE PROHIBITION | CORE ALTERNATION |
| | PRIMARY CACHE | CORE ALTERNATION VIRTUAL MECHANISM SCHEDULE PROHIBITION | CORE ALTERNATION |
| | SECONDARY CACHE | PROCESSOR ALTERNATION VIRTUAL MECHANISM SCHEDULE PROHIBITION | PROCESSOR ALTERNATION |
| | MEMORY BUS | PROCESSOR ALTERNATION VIRTUAL MECHANISM SCHEDULE PROHIBITION | PROCESSOR ALTERNATION |
| PROCESSOR TYPE 2 | CORE | CORE ALTERNATION VIRTUAL MECHANISM SCHEDULE PROHIBITION | CORE ALTERNATION |
| | PRIMARY CACHE | CORE ALTERNATION VIRTUAL MECHANISM SCHEDULE PROHIBITION | CORE ALTERNATION |
| | SECONDARY CACHE | CORE ALTERNATION VIRTUAL MECHANISM SCHEDULE PROHIBITION | CORE ALTERNATION |
| | MEMORY BUS | PROCESSOR ALTERNATION VIRTUAL MECHANISM SCHEDULE PROHIBITION | PROCESSOR ALTERNATION |

FIG. 20

INTERRUPT CONTROL TABLE 304

| PROCESSOR ID | CORE ID | INTERRUPT LEVEL | | | |
|---|---|---|---|---|---|
| | | LEVEL 1 | LEVEL 2 | LEVEL 3 | LEVEL 4 |
| PROCESSOR 1 | CORE 1 | DISABLED | DISABLED | DISABLED | DISABLED |
| | CORE 2 | ENABLED | ENABLED | ENABLED | ENABLED |
| | CORE 3 | ENABLED | ENABLED | ENABLED | ENABLED |
| | CORE 4 | ENABLED | ENABLED | ENABLED | ENABLED |
| PROCESSOR 2 | CORE 1 | DISABLED | DISABLED | DISABLED | DISABLED |
| | CORE 2 | DISABLED | DISABLED | DISABLED | DISABLED |
| | CORE 3 | DISABLED | DISABLED | DISABLED | DISABLED |
| | CORE 4 | DISABLED | DISABLED | DISABLED | DISABLED |
| PROCESSOR 3 | CORE 1 | ENABLED | ENABLED | ENABLED | DISABLED |
| | CORE 2 | ENABLED | ENABLED | ENABLED | DISABLED |
| | CORE 3 | ENABLED | ENABLED | ENABLED | DISABLED |
| | CORE 4 | ENABLED | ENABLED | ENABLED | DISABLED |
| | CORE 1 | ENABLED | ENABLED | ENABLED | DISABLED |
| | CORE 2 | ENABLED | ENABLED | ENABLED | DISABLED |
| | CORE 3 | ENABLED | ENABLED | ENABLED | DISABLED |
| | CORE 4 | ENABLED | ENABLED | ENABLED | DISABLED |
| PROCESSOR 4 | CORE 1 | ENABLED | ENABLED | DISABLED | DISABLED |
| | CORE 2 | ENABLED | ENABLED | ENABLED | DISABLED |
| | CORE 3 | ENABLED | ENABLED | DISABLED | DISABLED |
| | CORE 4 | ENABLED | ENABLED | ENABLED | DISABLED |
| | CORE 1 | ENABLED | ENABLED | DISABLED | DISABLED |
| | CORE 2 | ENABLED | ENABLED | ENABLED | ENABLED |
| | CORE 3 | ENABLED | ENABLED | ENABLED | DISABLED |
| | CORE 4 | ENABLED | ENABLED | DISABLED | DISABLED |

FIG. 24

111
FAULT COUNTERACTION TABLE

| PROCESSOR CLASSIFICATION (801) | PROCESSOR REGION (802) | COUNTERACTION TO BE TAKEN WHEN FAULT PREECHO IS DETECTED (2401) | COUNTERACTION TO BE TAKEN AT TIME OF FAULT (804) |
|---|---|---|---|
| PROCESSOR TYPE 1 | GENERAL PURPOSE CORE | CORE ALTERNATION VIRTUAL MECHANISM SCHEDULE PROHIBITION | CORE ALTERNATION |
| | DEDICATED CORE | PROCESSOR ALTERNATION | CORE ALTERNATION |
| | PRIMARY CACHE | CORE ALTERNATION VIRTUAL MECHANISM SCHEDULE PROHIBITION | CORE ALTERNATION |
| | SECONDARY CACHE | PROCESSOR ALTERNATION VIRTUAL MECHANISM SCHEDULE PROHIBITION | PROCESSOR ALTERNATION |
| | MEMORY BUS | PROCESSOR ALTERNATION VIRTUAL MECHANISM SCHEDULE PROHIBITION | PROCESSOR ALTERNATION |
| PROCESSOR TYPE 2 | GENERAL PURPOSE CORE | CORE ALTERNATION VIRTUAL MECHANISM SCHEDULE PROHIBITION | CORE ALTERNATION |
| | DEDICATED CORE | PROCESSOR ALTERNATION | CORE ALTERNATION |
| | PRIMARY CACHE | CORE ALTERNATION VIRTUAL MECHANISM SCHEDULE PROHIBITION | CORE ALTERNATION |
| | SECONDARY CACHE | CORE ALTERNATION VIRTUAL MECHANISM SCHEDULE PROHIBITION | CORE ALTERNATION |
| | MEMORY BUS | PROCESSOR ALTERNATION VIRTUAL MECHANISM SCHEDULE PROHIBITION | PROCESSOR ALTERNATION |

FIG. 28

108
SERVER CONFIGURATION TABLE

| SYSTEM ID (501) | PROCESSOR CONFIGURATION (502) | PROCESSOR TYPE (503) | MEMORY CAPACITY (504) | I/O DEVICE (505) | VIRTUALIZATION MECHANISM ID (506) | COOPERATION (2801) |
|---|---|---|---|---|---|---|
| SMP 1 | PROCESSOR 1 | FOUR CORES | 16GB | NETWORK 1<br>NETWORK 2<br>DISK ADAPTER 1<br>DISK ADAPTER 2 | VIRTUALIZATION MECHANISM 1 | VIRTUALIZATION MECHANISM 2 |
|  | PROCESSOR 2 | FOUR CORES |  |  |  |  |
| SMP 2 | PROCESSOR 3 | EIGHT CORES | 32GB | NETWORK 1<br>NETWORK 2<br>NETWORK 3<br>DISK ADAPTER 1<br>DISK ADAPTER 2 | VIRTUALIZATION MECHANISM 2 | VIRTUALIZATION MECHANISM 1 |
|  | PROCESSOR 4 | EIGHT CORES |  |  |  |  |
|  | PROCESSOR 5 | EIGHT CORES |  |  |  |  |
|  | PROCESSOR 6 | EIGHT CORES |  |  |  |  |

METHOD FOR IMPROVING RELIABILITY OF MULTI-CORE PROCESSOR COMPUTER

INCORPORATION BY REFERENCE

The present application claims priority from Japanese application JP2006-340673 filed on Dec. 19, 2006, the content of which is hereby incorporated by reference into this application.

BACKGROUND OF THE INVENTION

The present invention relates to a method for improving the reliability of a computer operating in a multi-core processor.

In computer systems and data systems of enterprises, the number of owned servers increases and consequently the operational management cost also increases. As a technique for solving this problem, there is improving the performance of the processor. Previously, the processor performance has been improved by improving the operation frequency of the processor. There are several different directions in users' anticipations of processor performance improvement. One of the directions is improving the performance to conduct processing faster. It becomes possible to obtain high-degree processing result in a short time by conducting more complicated processing in a short time. Another direction is facilitating the operational management. By using a processor having high processing performance in a server, a larger amount of processing can be conducted on a single server and consequently the number of servers to be managed can be reduced. As a result, the number of servers to be subject to the operational management is reduced, and the operational management is facilitated. At the present time, anticipations of improving the processor performance especially to facilitate the operational management are increasing. In this context, the multi-core processor is being positioned in the center of the processor architecture. The multi-core processor is an architecture incorporating a plurality of cores capable of conducting arithmetic operations in parallel in a single physical processor. Unlike the conventional art, the method of increasing the operational frequency of a single core is not used, but a method of improving the performance by having a large number of cores is used. The multi-core processor has several merits. As compared with the conventional processor which needs a large number of complicated logics, the power dissipation and the performance of the whole can be improved. Owing to such a multi-core processor, the performance of the server simple substance is improved as compared with the conventional art. As a result, the multi-core processor is anticipated as a technique for accelerating the facilitation of the operational management.

The conventional art is described in JP-A-2006-260568, JP-A-2004-30363, and JP-A-2003-330740.

SUMMARY OF THE INVENTION

It can be anticipated that multi-core processor will facilitate the operational management in addition to the performance improvement. On the other hand, however, there is a problem of lowered availability. High availability makes it a condition that the processing in the system can be continued even if a fault occurs in a specific region. The multi-core processor improves the performance by incorporating a large number of cores into a single processor. From the viewpoint of availability, however, it means that a range affected by a fault in the single processor becomes large. In other words, owing to the multi-core processor a system can be constructed using a small number of processors, whereas the availability falls. For example, when constructing a system of a total of 20 GHz by using single-core processors each having one core of 2 GHz mounted thereon, twenty processors are needed. If a system is constructed on twenty processors, a range affected by a fault in a single processor is one twentieth. On the other hand, a multi-core processor obtained by mounting four 2-GHz cores on a single processor can be constructed so as to obtain the same performance by using five processors. In this case, however, the range affected by a fault in a single processor becomes four twentieths at maximum. Thus, the multi-core processor has a problem that influence exerted when a fault has occurred becomes great.

As a different problem, there is availability falling in virtualization of a server having a multi-core processor mounted thereon. As another method for facilitating the operational management, there is a server virtualization technique. The server virtualization technique is a technique capable of operating a plurality of virtual servers on a single physical server. The physical server has resources such as a processor and a memory. According to the server virtualization technique, a plurality of virtual servers are executed simultaneously on a single physical server by dividing the resources and assigning them to different virtual servers. Because of improvement of the performance owing to the use of the multi-core processor and a lowered cost of resources such as memories, needs for the server virtualization technique is increasing. The server virtualization technique has a merit that more effective utilization of the server resources is attempted by workload control, besides a merit of unification obtained by operating a plurality of virtual servers on a single physical server. The workload control is processing for causing the virtual server to increase or decrease resources such as CPUs and memories in physical servers according to the situation. For example, if the load of a certain virtual server has become high, resources are lent from a virtual server having a low load among other virtual servers operating on the same physical server. As a result, it becomes possible to use resources in the physical server effectively.

In the server virtualization environment, the multi-core processor can retain a large number of processor resources, and consequently the multi-core processor can have a capability of generating a large number of virtual servers from a single processor. In other words, it becomes possible to unify a large number of servers to fewer servers. Thus, it can be anticipated that facilitation of the operational management is advanced by a synergistic effect of the multi-core processor and the virtualization technique. As a matter of fact, the reliability of the system can be improved by combining the virtualization technique with a plurality of processors. For example, there is a technique of constructing principal and vice hot stand-by environments by using a plurality of virtual servers generated in a physical server and thereby constructing a highly reliable environment which requires a plurality of physical servers in the conventional art, with a single physical server. In the conventional art, there are a technique of constructing a hot stand-by among a plurality of virtual servers and a technique of detecting a preecho of a fault and constructing a new virtual server by way of precaution against the fault. However, these techniques are not techniques intended for the multi-core processor, but they are techniques for improving the reliability using virtual processors in the single-core processor environment. In addition, the magnitude of the range affected by a fault is not taken into consideration, and consequently these techniques are not techniques corresponding to the multi-core processor.

Therefore, an object of the present invention is to improve the reliability and availability of virtual servers in the multi-core processor environment.

In a system including a plurality of multi-core processors, a table for managing the processors and cores owned by the processors is provided and a single virtual server is formed by using cores owned by different processors when generating the virtual server.

According to the number owned by processors, the number of processors is varied. If a fault preecho in a processor is detected, control is exercised so as not to deliver an execution schedule of a virtualization mechanism to the processor in which the fault preecho has been detected.

In a system including a plurality of multi-core processors, arithmetic cores owned by a plurality of different processors are assigned to processing of a process or thread in an operating system.

In a system including a plurality of multi-core processors, arithmetic cores owned by a plurality of different processors are assigned to an operating system.

It becomes possible to improve the availability in the multi-core processor environment.

Other objects, features and advantages of the invention will become apparent from the following description of the embodiments of the invention taken in conjunction with the accompanying drawings.

BRIEF DESCRIPTION OF THE DRAWINGS

FIG. 5 shows a server configuration table;
FIG. 6 shows a virtualization mechanism management table;
FIG. 8 shows a fault counteraction table;
FIG. 20 shows an interrupt control table;
FIG. 24 shows a fault counteraction table in the second embodiment;
FIG. 28 shows a server configuration table at the time of cooperation between virtualization mechanisms.

DESCRIPTION OF THE EMBODIMENTS

Hereafter, embodiments of the present invention will be described with reference to the drawings.

1. First Embodiment

Figure 1:
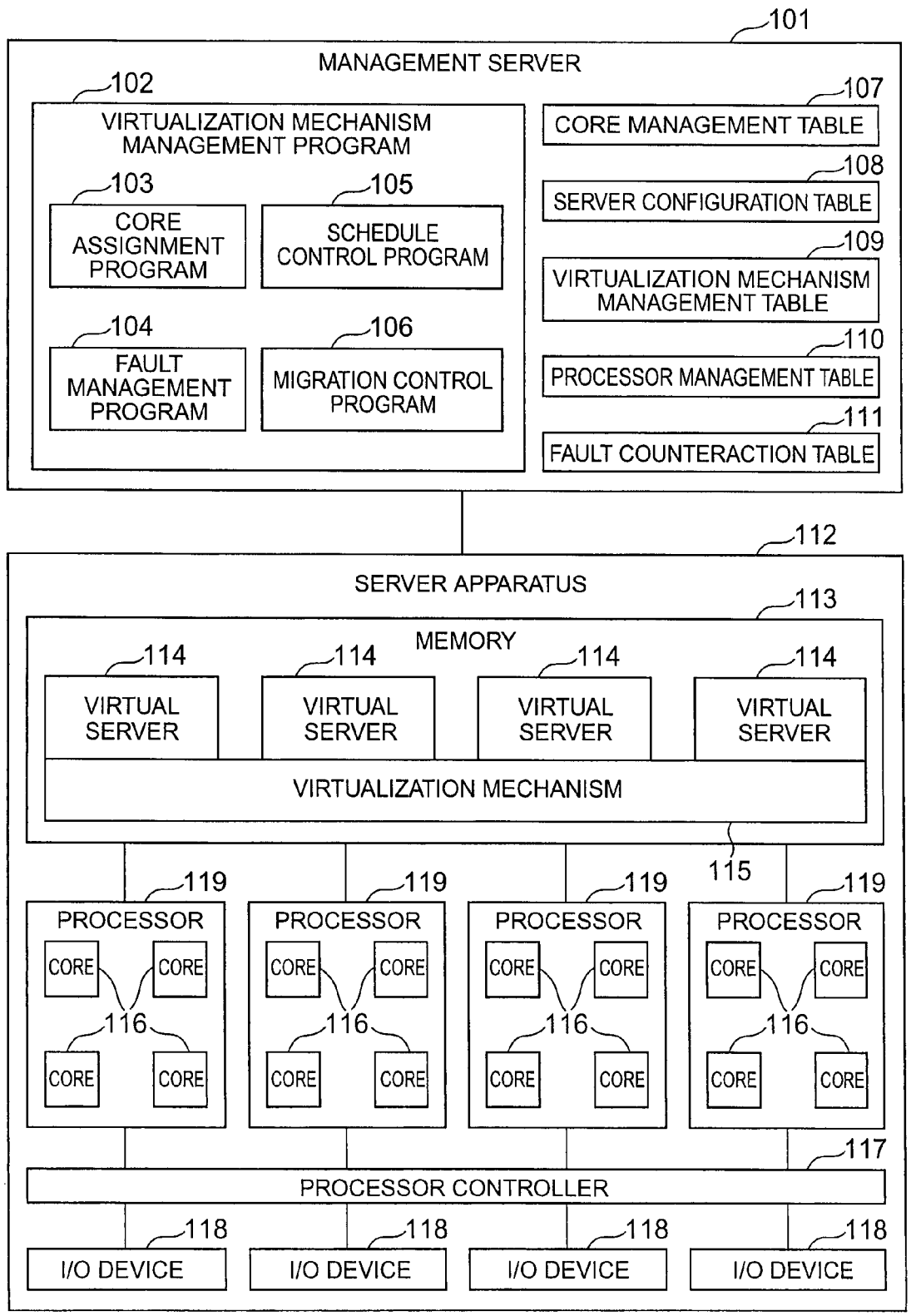
FIG. 1 shows a general configuration diagram according to the present invention.

FIG. 1 shows a general diagram of an embodiment according to the present invention. A management server 101 serves as a center of control in the present embodiment. A virtualization mechanism management program 102 is a program for managing a virtualization mechanism 115 which operates in a server apparatus 112 to be managed. The virtualization mechanism management program 102 includes a core assignment program 103, a fault management program 104, a schedule control program 105, and a migration control program 106. The core assignment program 103 exercises control for assigning a processor 119 owned by the server apparatus 112 or a core 116 included in the processor 119 to a virtual server 114. The fault management program 104 is executed when a fault or a fault preecho is detected in the processor 119 or a core 116, and the fault management program 104 conducts management such as alternation of the processor 119 or the core 116. The schedule control program 105 issues an order to the virtualization mechanism 115 to change an execution schedule of the processor 119 or the core 116. The migration control program 106 is a program that orders the virtualization mechanism 115 to conduct alternation of the processor 119 or the core 116. These programs are executed while updating and referring to a core management table 107, a server configuration table 108, a virtualization mechanism management table 109, a processor management table 110, and a fault counteraction table 111. The server apparatus 112 to be managed includes a memory 113, processors 119, cores 116 incorporated in the processors 119, a processor controller 117, and I/O devices 118. In the memory 113, the virtualization mechanism 115 is stored and executed, and consequently the virtual servers 114 are generated. If the virtualization mechanism 115 distributes resources such as the memory 113, the processors 119, and the I/O devices 118 to a virtual server 114, the virtual server can have a function equivalent to that of the server.

Figure 29:
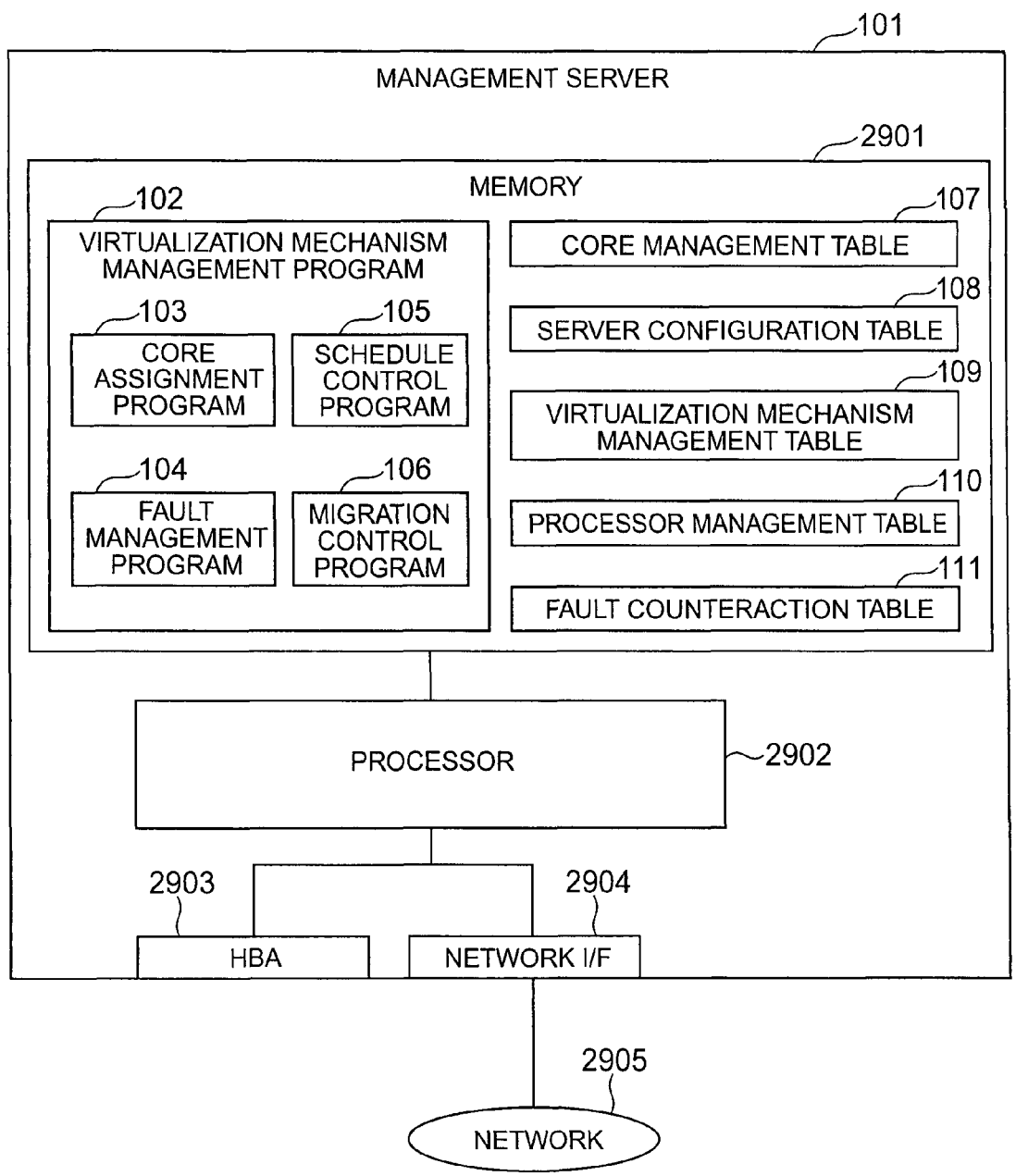
FIG. 29 shows a configuration of a management server.

FIG. 29 describes relations between hardware and programs. The management server 101 includes a memory 2901 for storing data such as programs and tables, a processor 2902 for executing programs, an HBA (Host Bus Adaptor) serving as an interface for disk access, and a network interface 2904. The virtualization mechanism management program 102 and the tables in the present invention are stored in the memory. The virtualization mechanism management program 102 is implemented by being executed in the processor 2902. For simplifying the description, however, a program is hereafter supposed to be an execution subject as regards the processing in the processor 2902. The core assignment program 103, the schedule control program 105, the fault management program 104, and the migration control program 106 implement the virtualization mechanism management processing by being executed in the processor 2902. Alternatively, they can also be implemented with hardware by implementing them as processing units for conducting processing such as a core assignment unit, a schedule control unit, a fault management unit, and a migration unit.

Figure 2:
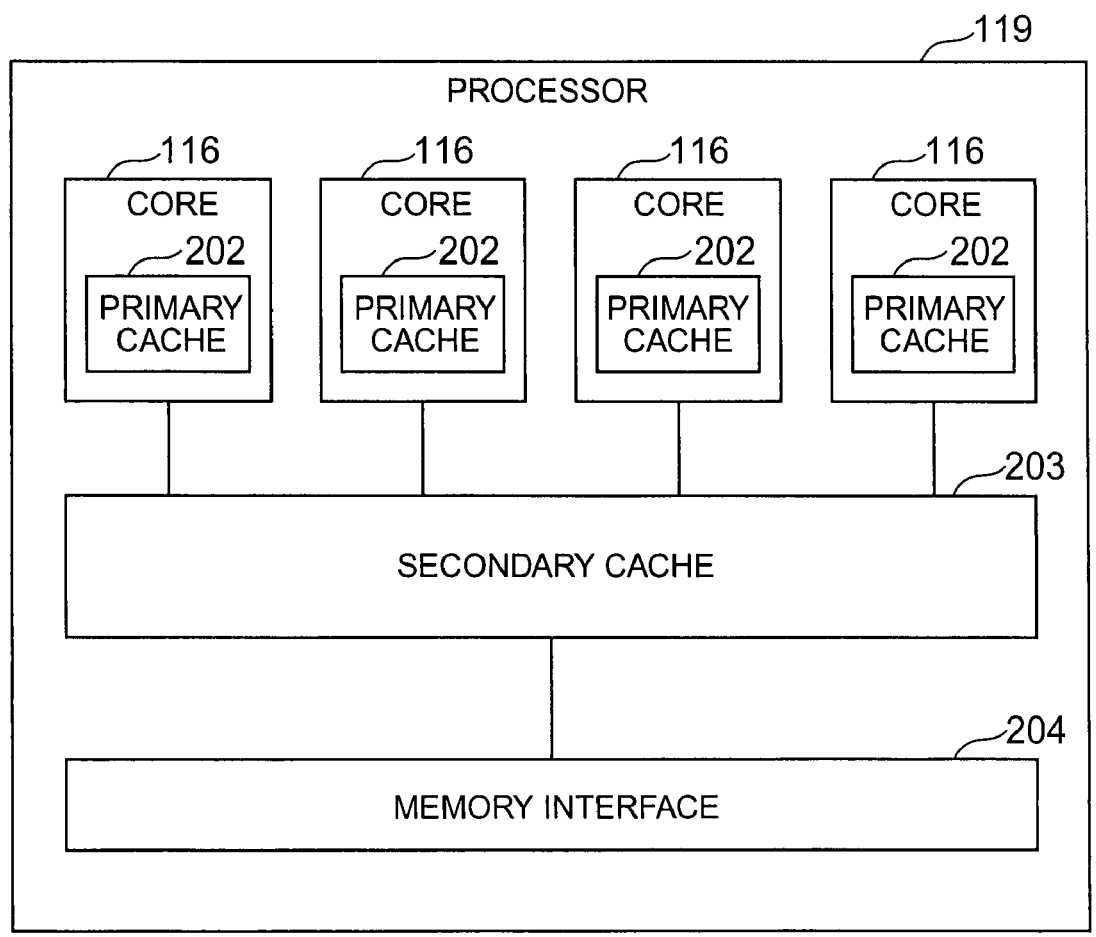
FIG. 2 shows a configuration diagram of a processor.

FIG. 2 shows a configuration example of the processor 119. A plurality of cores 116 are incorporated in the processor 119. The core 116 can read an instruction from the memory 113, execute the instruction, and conduct data reading or writing on the memory 113. A primary cache 202 in the core 116 is a fast memory for reading and writing an instruction and data fast. The cores 116 have a secondary cache 203 which is larger in capacity than the primary cache 202. The secondary cache 203 is shared by the cores 116. The cores have a memory interface for inputting and outputting data and an instruction to and from the external memory 113. The cores 116 can operate independently of each other. Therefore, the processing performance is improved as the number of the cores 116 is increased. The cores 116 can take the form of a multiprocessor. In other words, although the cores 16 operate independently, a program on the memory 113 can use the cores 16 as if they form a single system. For example, if a plurality of programs are operating on the memory 113, typically a system program called operating system automatically assigns execution control to the cores 116 and consequently it can be made to look as if a plurality of programs have been executed simultaneously when viewed from a program.

Figure 3:
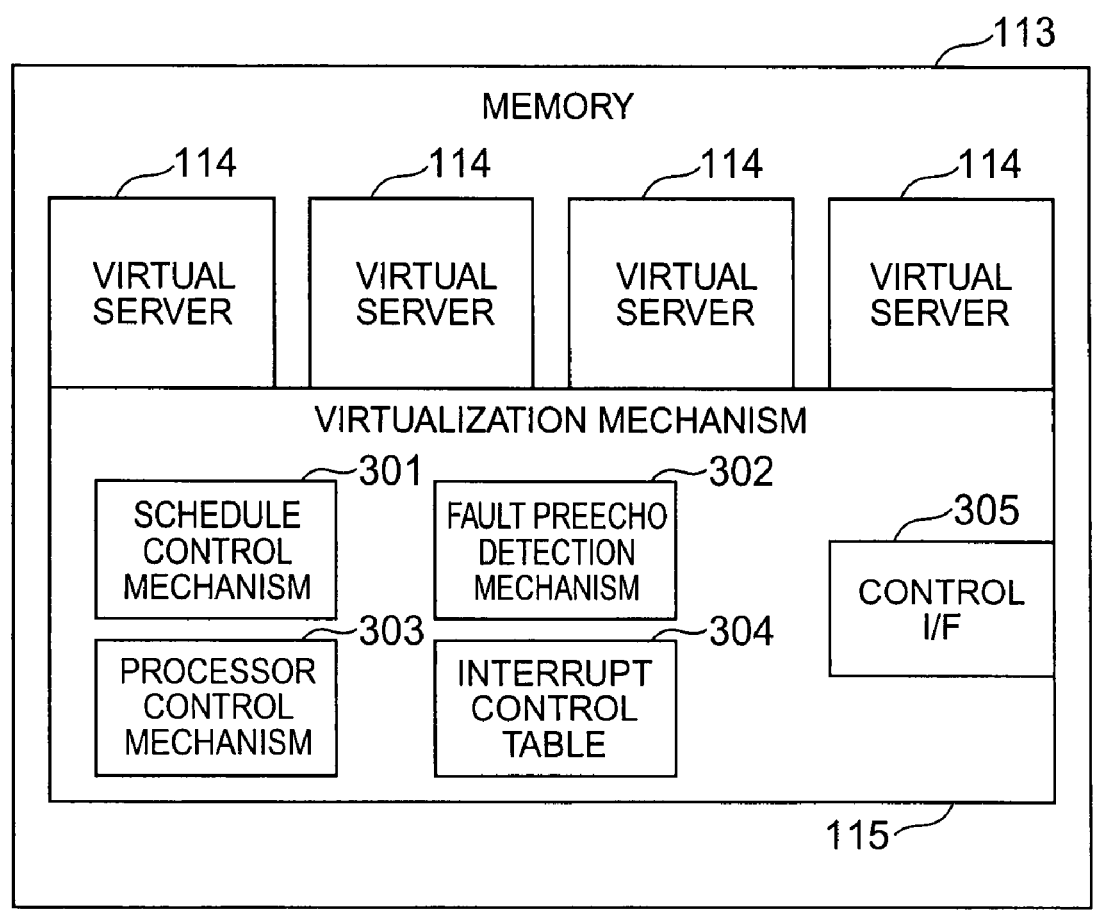
FIG. 3 shows a configuration diagram of a virtualization mechanism.

FIG. 3 shows details of the virtualization mechanism 115. The virtualization mechanism 115 operates in the memory 113 included in the server apparatus 112. The virtualization mechanism 115 includes a schedule control mechanism 301, a processor control mechanism 303, a fault preecho detection mechanism 302, an interrupt control table 304, and a control interface (I/F) 305. The schedule control mechanism 301 exercises execution schedule control on programs relating to the virtualization mechanism 115. The processor control mechanism 303 controls the operation mode of the processor 119. The fault preecho detection mechanism 302 is a mechanism which is activated periodically or when the processor 119 comes in the idle state and which checks the hardware. These operations can be controlled from the outside via the control I/F 305.

Figure 4:
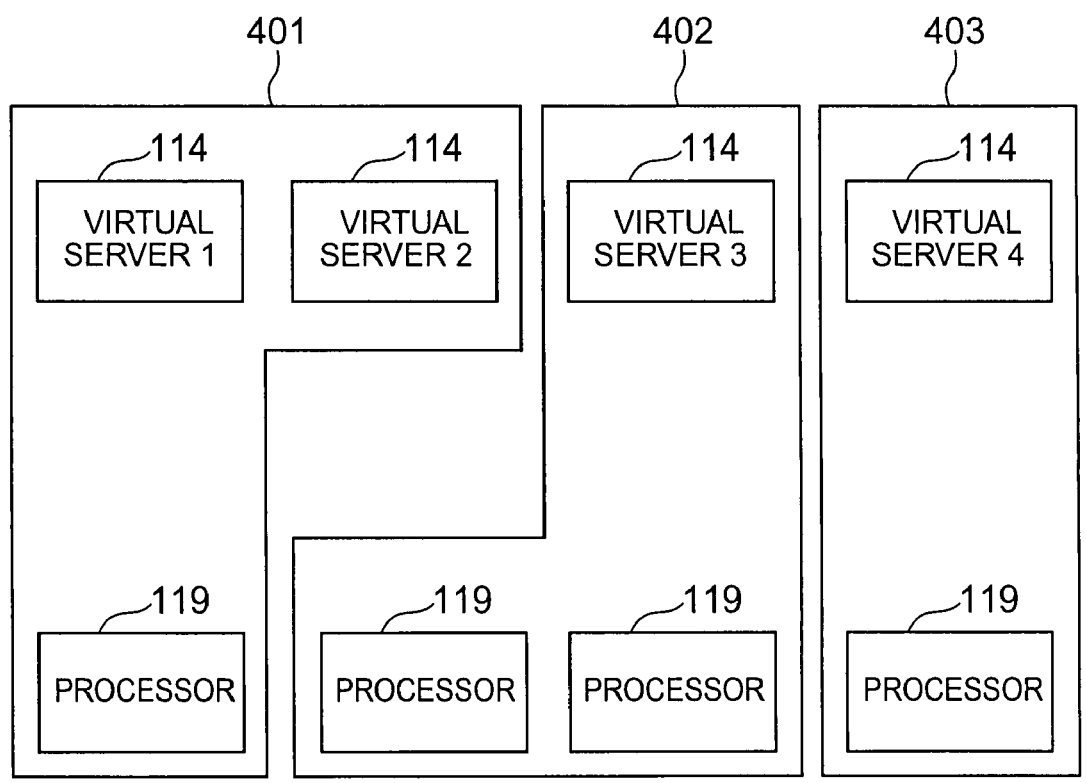
FIG. 4 shows a method of assigning processors to virtual servers.

FIG. 4 shows a state in which the processors 119 have been assigned to the virtual servers 114 by the virtualization mechanism 115. There are several methods in assigning the processors 119 to the virtual servers 114. A way of assignment in 401 is a method of assigning a single processor 119 to a plurality of virtual servers 114. This is called shared assignment method as well, and it is an assignment method used when a plurality of virtual servers 114 share the same processor 119 resource and more virtual servers 114 than the processors 119 are constructed. A way of assignment in 402 and 403 is called dedicated assignment method as well, and a dedicated processor(s) 119 is assigned to the virtual server 114 and the dedicated processor is not shared by another virtual server. In the way of assignment, there are several patterns. In the way 402, a plurality of processors 119 are assigned to a single virtual server 114. When a high performance virtual server 114 is required, such a way of assignment is used. In this way, the virtualization mechanism 115 distributes resources such as the processors 119 in the server apparatus 112 to a plurality of virtual servers 114, and thereby generates a plurality of virtual servers 114. The virtual servers 114 can also operate in parallel. Although the way of assigning the processors 119 has been described heretofore, resources such as the I/O devices 118 and the memory 113 can also be divided and assigned in the same way.

FIG. 5 shows the server configuration table 108. The server configuration table 108 is a table provided mainly to manage the configuration of the hardware in the server apparatus 112. A column 501 indicates a system identifier (ID). The system ID 501 is an identifier given by taking a single server configuration as the unit. As an example, the multi-processor configuration or the like is considerable. As indicated in a column 502, a single system ID 501 is associated with a single processor or a plurality of processors. As indicated in a column 503, a plurality of cores are mounted on each processor. The number of cores owned by each processor is described in the column 503. In a column 504, the total memory capacity in the system is stored. In a column 504, kinds and the number of I/O devices owned by the system are stored. For example, the I/O devices are network adaptors used for connection to networks and disk adaptors used for connection to disks. In a column 506, an identifier (ID) of a virtualization mechanism is stored. Owing to these columns, hardware resources per system can be grasped. Furthermore, it becomes possible to manage hardware resources that can be used by a virtualization mechanism by associating the hardware resources with virtualization mechanisms.

FIG. 6 shows a configuration of the virtualization mechanism 109. A column 601 indicates a virtualization mechanism ID. This is the virtualization mechanism ID corresponding to that in the column 506 shown in FIG. 5. In a column 602, a generated virtual server ID is stored. All virtual server IDs generated by the virtualization mechanism are stored. Not only the generated virtual servers, but also information concerning a resource pool which indicates idle hardware resources owned by the virtualization mechanism is described. This is because when generating a new virtual server or adding a resource to an existing virtual server, assignment from idle resources owned by the system is conducted and consequently it is necessary to manage remaining resources. In a column 603, a processor ID assigned to the virtual server is stored. If a plurality of processors are assigned, a plurality of processor IDs are described. In a column 604, a core ID owned by the processor described in the column 603 is stored. As a result, it becomes possible to manage the assignment to virtual servers by taking a core as the unit. In a column 605, a memory capacity assigned to the virtual server is stored. In a column 606, I/O devices assigned to the virtual server are stored. The virtualization mechanism management table 109 is updated, when a new virtual server is generated or eliminated or a change has occurred in assigned resources.

Figure 7:
FIG. 7 shows a processor management table.

FIG. 7 shows a configuration of the processor management table 110. Information concerning a processor fault is mainly stored in the processor management table 110. In a column 701, a processor ID is stored. In a column 702, core IDs owned by the processor are stored. In a column 703, a state of the processor or the core is stored. For example, if a fault preecho is detected or if a fault has occurred, a region is stored. When a fault or a fault preecho is detected in a server environment having a plurality of processors and a plurality cores, a region in a processor can be discriminated by using the processor management table 110.

FIG. 8 shows a configuration of the fault counteraction table 111. Countermeasures for the case where a fault has occurred in a processor and the case where a fault preecho has been detected are described in the fault counteraction table 111. The countermeasures are described for each processor classification 801. By using the processor classification 801, an architecture of the processor can be discriminated and countermeasures at the time of fault obtained by difference in architecture can be managed. In a column 802, a processor region is stored. In a column 803, countermeasures in the case where a fault preecho is detected are stored. For example, contents such as a core alternation and virtualization mechanism schedule prohibition are stored. The "core alternation" means assigning an alternative core in response to detection of a fault preecho. The "virtualization mechanism schedule prohibition" means prohibiting the core or processor from scheduling the virtualization mechanism. "Processor alternation" means alternating all cores in the processor with cores in another processor. The counteraction differs according to the region. For example, if a core and a primary cache are incorporated in the same core and the core is independent of another core, alternation may be conducted by taking a core as the unit. If a secondary cache is shared by a plurality of cores, the influence at the time of fault occurrence is great and consequently it is desirable to conduct alternation by taking a processor as the unit. In a column 804, an counteraction to be taken at the time of a fault is described. Its contents are similar to those in the column 803. In this way, the priority at the time when a fault preecho is detected differs depending upon the processor architecture. The fault counteraction table 111 is provided to manage them every architecture.

Figure 9:
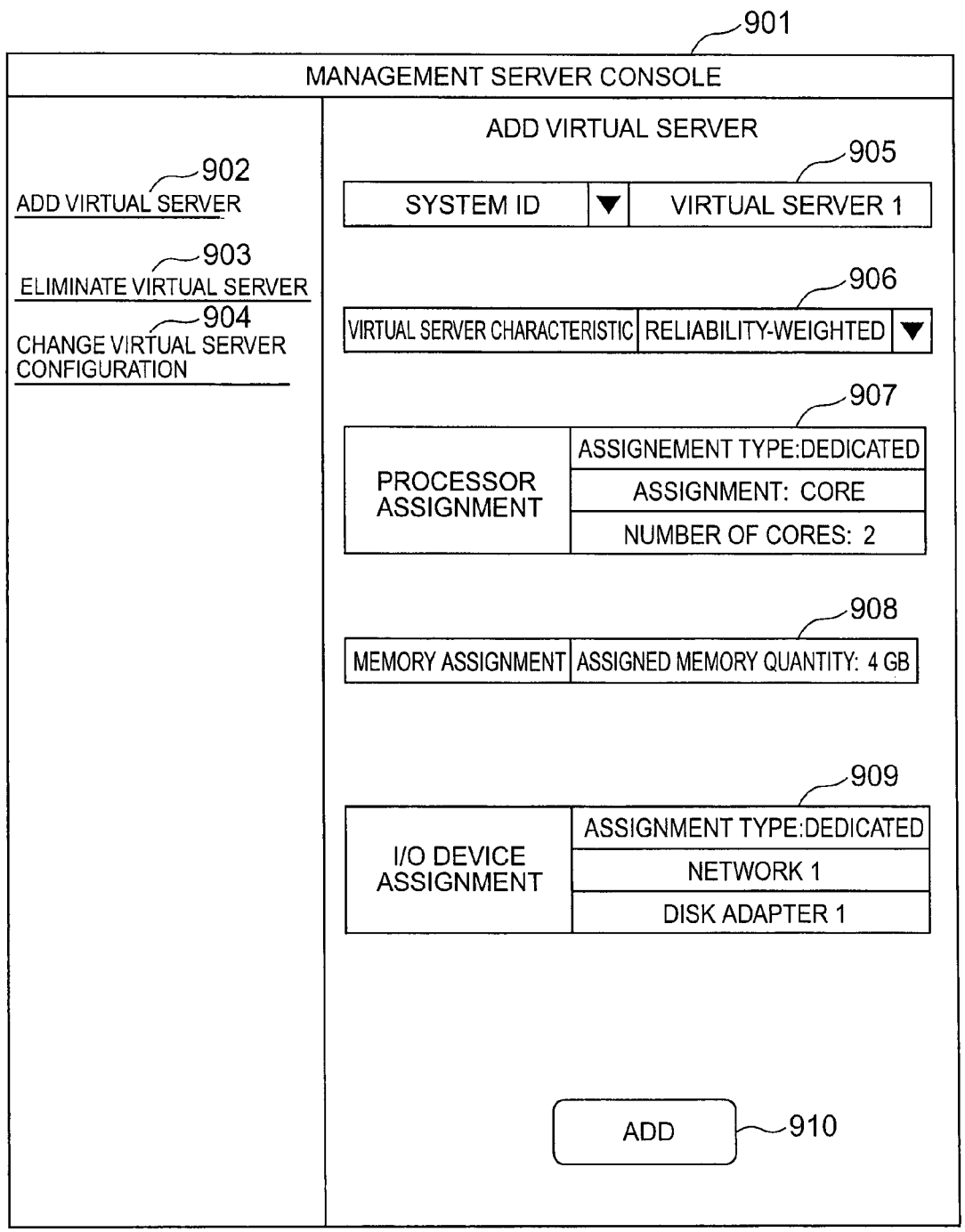
FIG. 9 shows a user interface.

FIG. 9 shows an example of a management server console. In FIG. 9, a user interface in the case where a virtual server is newly generated is described. Reference numeral 901 denotes a general diagram of the user interface. Reference numerals 902 to 904 denote menus for selecting an counteraction for the virtual server. Contents of the menu selected here are displayed on the right hand side in the management server console. In FIG. 9, contents of virtual server addition are displayed. In 905, an ID of a virtual server to be generated is input. The user can select a system ID in which the virtual server is to be generated. In 906, a characteristic of a virtual server to be generated is input. This is contents featuring the present invention. As the characteristic of the virtual server, for example, a characteristic such as reliability-weighted, performance-weighted, or ordinary is considerable. The "reliability-weighted" means conducting an assignment that becomes strong against a fault even if resources of the same quantity are assigned. The "performance-weighted" means a way of assignment with stress laid on high performance as compared with the reliability. The "ordinary" means assigning idle resources with stress laid on neither the reliability nor the performance. In 907, a way of processor assignment is selected. For example, a way of assignment such as dedicated assignment or shared assignment, whether a core or a processor is taken as the unit of assignment, and the number of assigned cores or processors are input. In 908, a memory quantity to be assigned is input. In 909, an I/O device to be assigned is input. If contents described in a resource pool in the virtualization mechanism management table 109 are reflected into the user interface at the time of resource input, input mistakes can be reduced and inputting is facilitated. If all items have been input, a new virtual server can be generated with input parameters by pressing a button 910.

Figure 10:
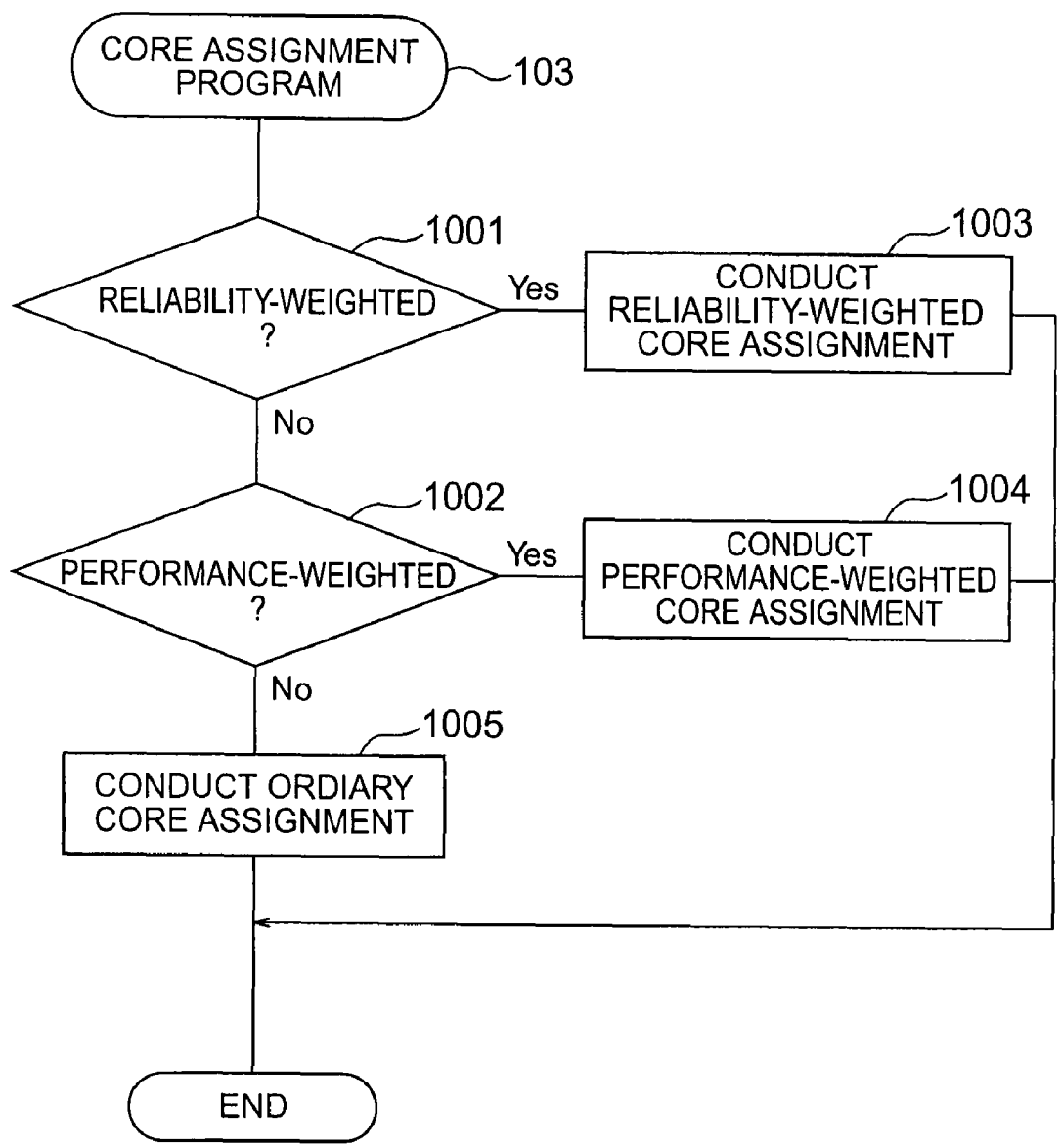
FIG. 10 shows a flow chart of a core assignment program.
Figure 11:
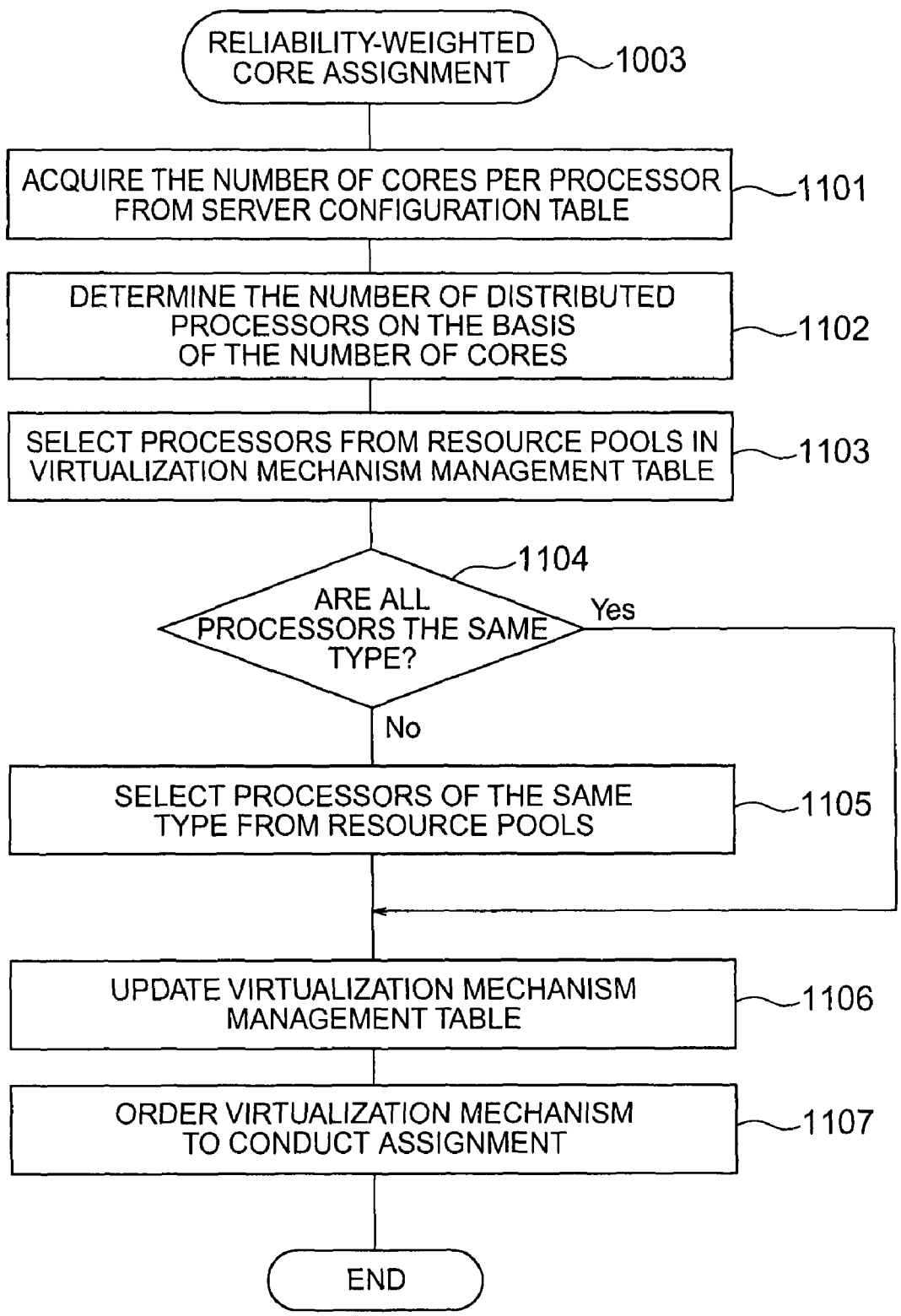
FIG. 11 shows a flow chart of reliability-weighted core assignment.

FIG. 10 shows a flow chart of the core assignment program 103. Operation of the core assignment program 103 changes according to a result of inputting in 906 in the user interface shown in FIG. 9. Steps in the core assignment program 103 will now be described. If it is found at step 1001 that the reliability-weighted is input, the processing proceeds to step 1003 and reliability-weighted core assignment processing is conducted. If it is found at step 1002 that the performance-weighted is input, the processing proceeds to step 1004 and performance-weighted core assignment processing is conducted. If the input is neither the "reliability-weighted" nor the "performance-weighted," the processing proceeds to step 1005 and the ordinary core assignment processing is conducted.

Each assignment processing will now be described with reference to a detailed flow chart. In the reliability-weighted core assignment processing 1003, the way of core assignment that raises the reliability is used when generating a virtual server. When assigning a plurality of cores to a single virtual server, high reliability core assignment means selecting and assigning cores in different processors. At step 1101, the number of cores per processor is acquired from the server configuration table 108. At step 1102, the number of distributed processors is determined on the basis of the number of cores. For example, as a processor has a larger number of cores, cores in as many different processors as possible are selected. This is because a processor having a larger number of cores exerts a greater influence when a fault has occurred therein. Accordingly, cores in as many different processors as possible are selected and assigned. Even if a fault occurs in a processor, therefore, it is possible to prevent all cores in the virtual server being stopped by the fault. At step 1103, processors are selected from resource pools in the virtualization mechanism management table 109. At step 1104, a decision is made whether all selected processors are processors of the same type. At step 1105, processors of the same type are selected from resource pools. This is because when determining cores to be assigned to a single virtual server, it can reduce the dispersion in reliability by selecting processors having the same number of cores as far as possible. If there are not idle processors of the same type, a method of selecting processors that are as close in the number of cores as possible is also conceivable. At step 1106, the virtualization mechanism management table 109 is updated. At step 1107, the virtualization mechanism 115 is ordered to generate a new virtual server on the basis of the selected cores. By thus selecting cores in different processors for a single virtual server, it is possible to prevent all cores in a virtual server from being made faulty by a fault in a single processor.

Figure 12:
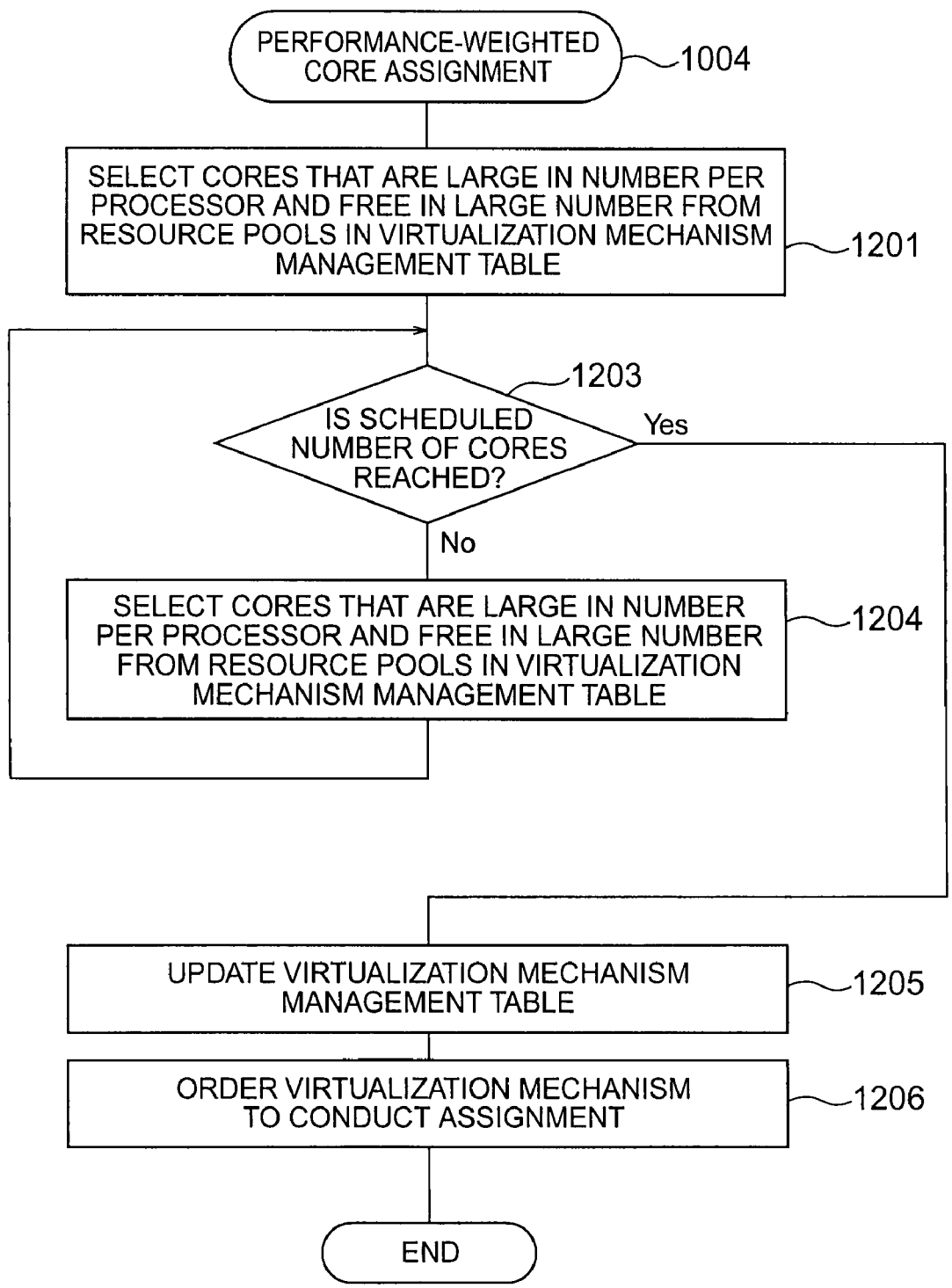
FIG. 12 shows a flow chart of performance-weighted core assignment.

FIG. 12 shows a flow chart of the performance-weighted core assignment processing 1004. The term "performance-weighted" means assigning cores in the same processor as far as possible to a virtual server. This aims at, for example, using the secondary cache shared by a plurality of cores efficiently. The possibility that programs executed in a single virtual server will refer to/update the same instruction or data is high. In such a case, the cache hit ratio can be improved by sharing the cache as far as possible. For using the cache efficiently and obtaining high performance, therefore, it is desirable to assign cores in the same processor as far as possible. At step 1201 in the performance-weighted core assignment processing 1004, cores that are large in the number per processor and that are idle in large number are selected from the resource pools in the virtualization mechanism management table 109. At step 1203, a decision is made whether a scheduled number of cores has been reached. If the scheduled number of cores has not been reached, cores that are large in the number per processor and that are idle in large number are selected from the resource pools in the virtualization mechanism management table 109 at step 1204 and the step 1203 is repeated. At step 1205, the virtualization mechanism management table 109 is updated. At step 1206, the virtualization mechanism 115 is ordered to generate a new virtual server on the basis of the selected cores. Owing to such processing, it becomes possible to provide a way of assignment that improves the performance of virtual servers.

Figure 13:
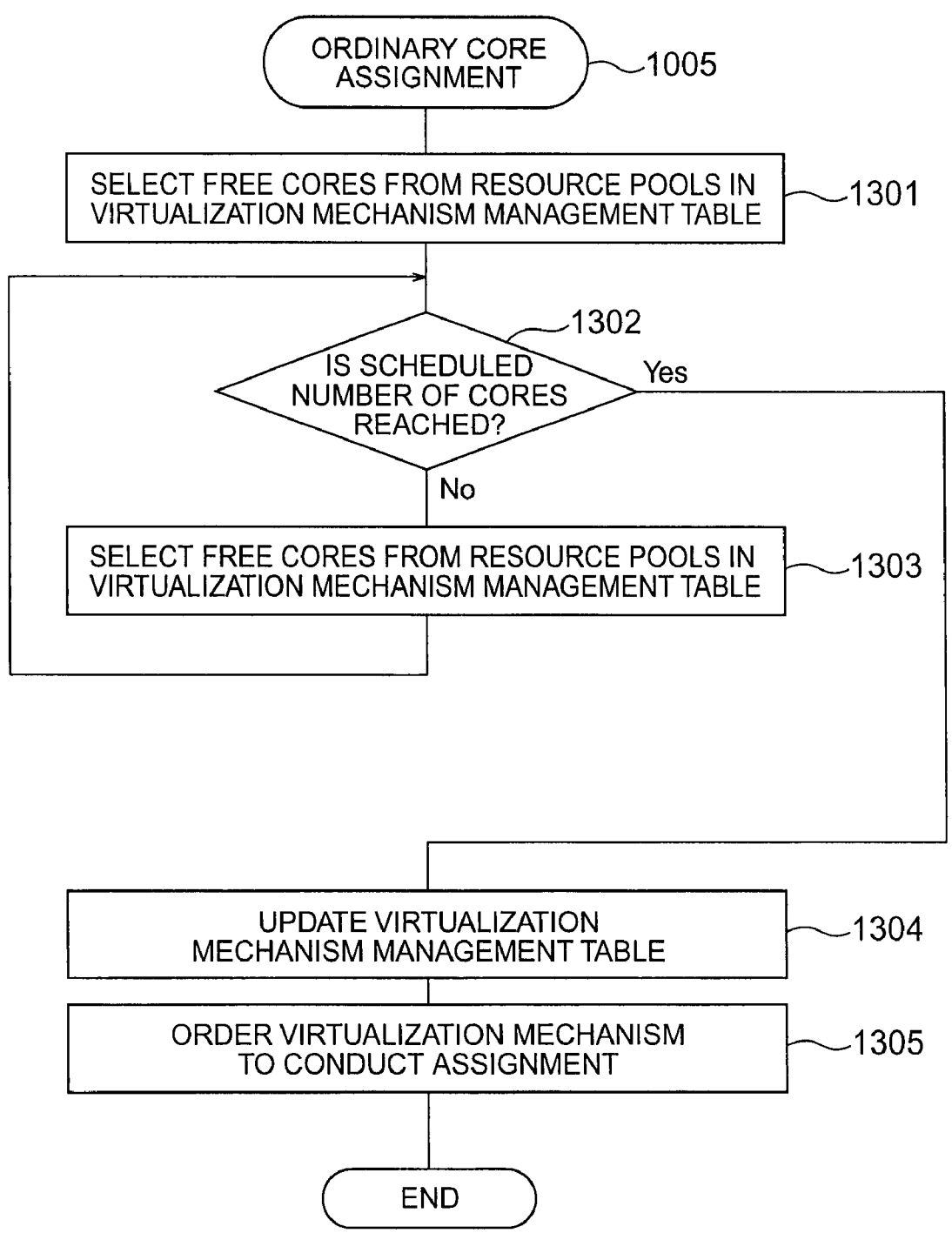
FIG. 13 shows a flow chart of ordinary core assignment.

FIG. 13 shows a flow chart of the ordinary core assignment processing 1005. The ordinary type is a way of assignment in the case where neither the reliability nor the performance is weighted. Basically, idle resources are retrieved in order and cores are assigned. At step 1301 in the ordinary core assignment processing 1005, idle cores are selected from the resource pools in the virtualization mechanism management table 109. At step 1302, a decision is made whether a scheduled number of cores has been reached. If the scheduled number of cores has not been reached, idle cores are selected from the resource pools in the virtualization mechanism management table 109 and then the step 1302 is repeated. At step 1304, the virtualization mechanism management table 109 is updated. At step 1305, the virtualization mechanism 115 is ordered to generate a new virtual server.

Figure 14:
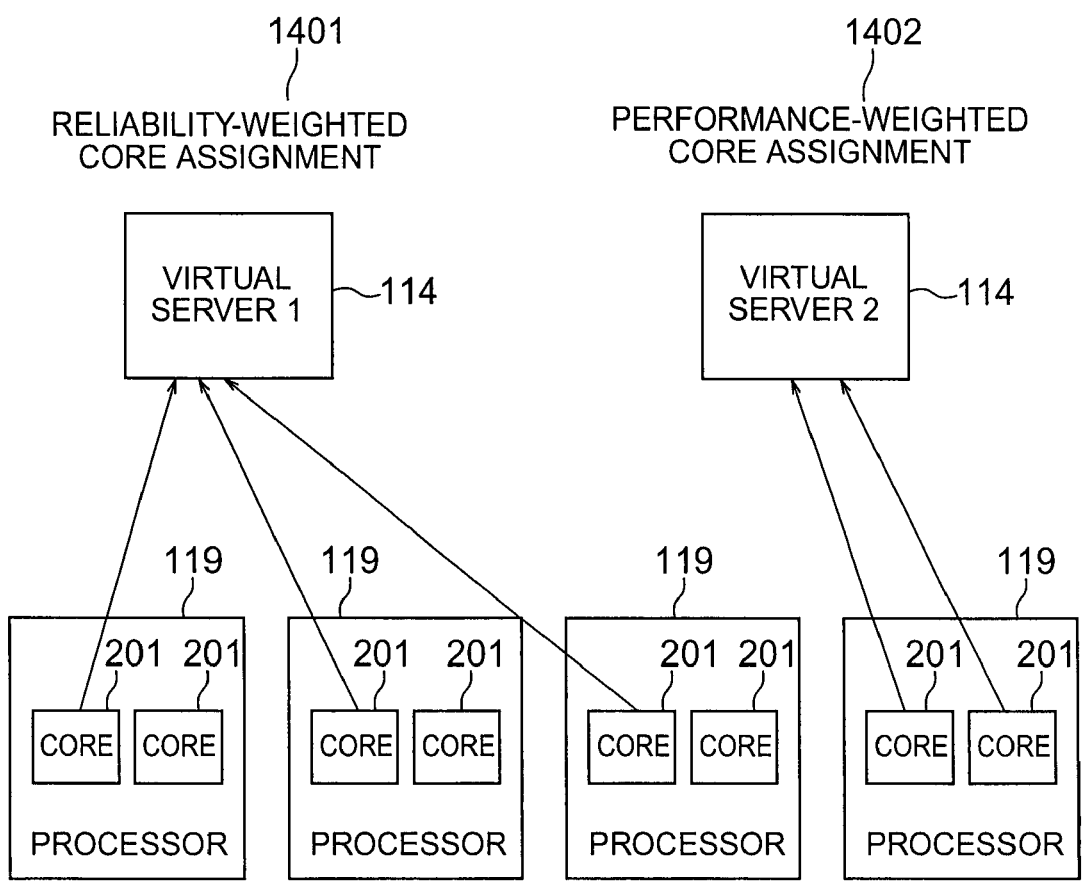
FIG. 14 shows an example of core assignment.

FIG. 14 shows an example of a result of the reliability-weighted core assignment processing and the performance-weighted core assignment processing. Reference numeral 1401 denotes a result of the reliability-weighted core assignment processing. It is a feature to thus assign cores in a plurality of different processors to a single virtual server. Even if a fault occurs in a processor, therefore, all virtual servers are not stopped. On the other hand, reference numeral 1402 denotes an example of a result of the performance-weighted core assignment. In this way, it is a feature to assign cores in the same processor to a virtual server as far as possible. As a result, the performance can be improved by using an instruction and data of the shared secondary cache effectively. Although not shown in FIG. 14, there is also an assignment method with both the performance and reliability weighted. For example, the number of different processors is reduced, and instead cores in the same processor are assigned preferentially. This is a mixture of two ways of assignment. By doing so, it is also possible to generate a virtual server that satisfies the reliability and performance requirements.

Figure 15:
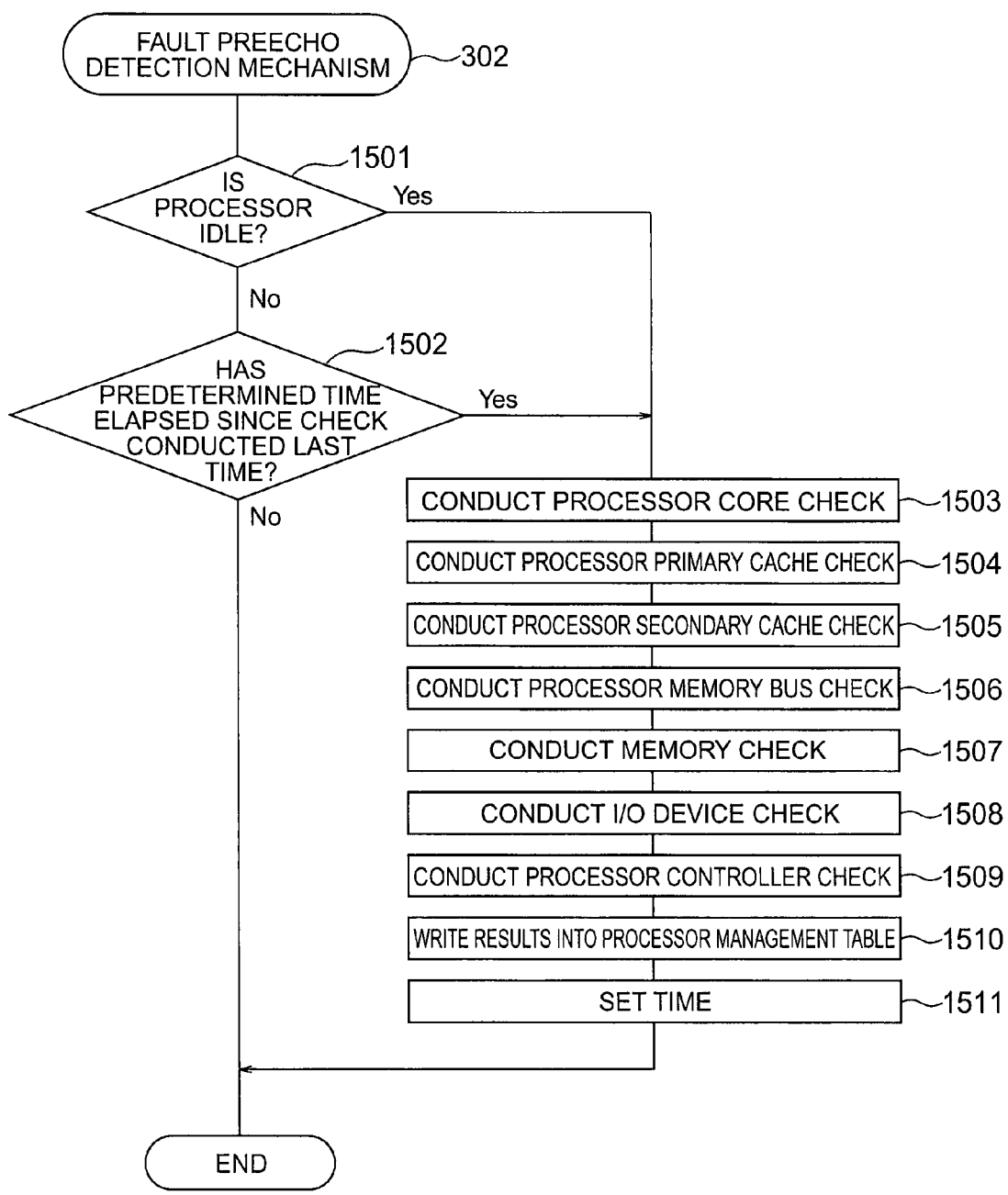
FIG. 15 shows a flow chart of a fault preecho detection mechanism.

FIG. 15 shows a flow chart of the fault preecho detection mechanism 302. The fault preecho detection mechanism 302 is executed in the virtualization mechanism 115 to check hardware when a processor is idle or a predetermined time has elapsed. At step 1501 in the fault preecho detection mechanism 302, a decision is made whether a processor is idle. At step 1502, a decision is made whether a predetermined time has elapsed since a check conducted last time. If either the condition at the step 1501 or the condition at the step 1502 is satisfied, hardware checks in step 1503 and subsequent checks are executed. At the step 1503, a processor core check is executed to check whether there is a fault preecho in the cores in the processor. At step 1504, it is checked whether there is a fault preecho in the primary caches in the processor. At step 1505, it is checked whether there is a fault preecho in the secondary cache in the processor. At step 1506, it is checked whether there is a fault preecho in a memory bus in the processor. For these fault preecho checks in the processor, it is conceivable to use, for example, a method of issuing a dedicated instruction for a check to the processor. At step 1507, it is checked whether there is a fault preecho in the memory. As for the memory check, it is conceivable to use, for example, a memory error detection mechanism such as a parity or an ECC (Error Check and Correct memory). At step 1508, an I/O device check is conducted. At step 1509, a processor controller check is conducted. At step 1510, results of checks conducted at the steps 1503 to 1509 are written into the processor management table 110. At step 1511, the current time when the checks are conducted is recorded. This is used in the check decision at the next time (step 1502). Also in the case where not a fault preecho but a fault has occurred at the time of a check, the fault is recorded in the processor management table 110 in the same way as the fault preecho.

Owing to the processing heretofore described, it becomes possible to previously grasp a hardware fault.

Figure 16:
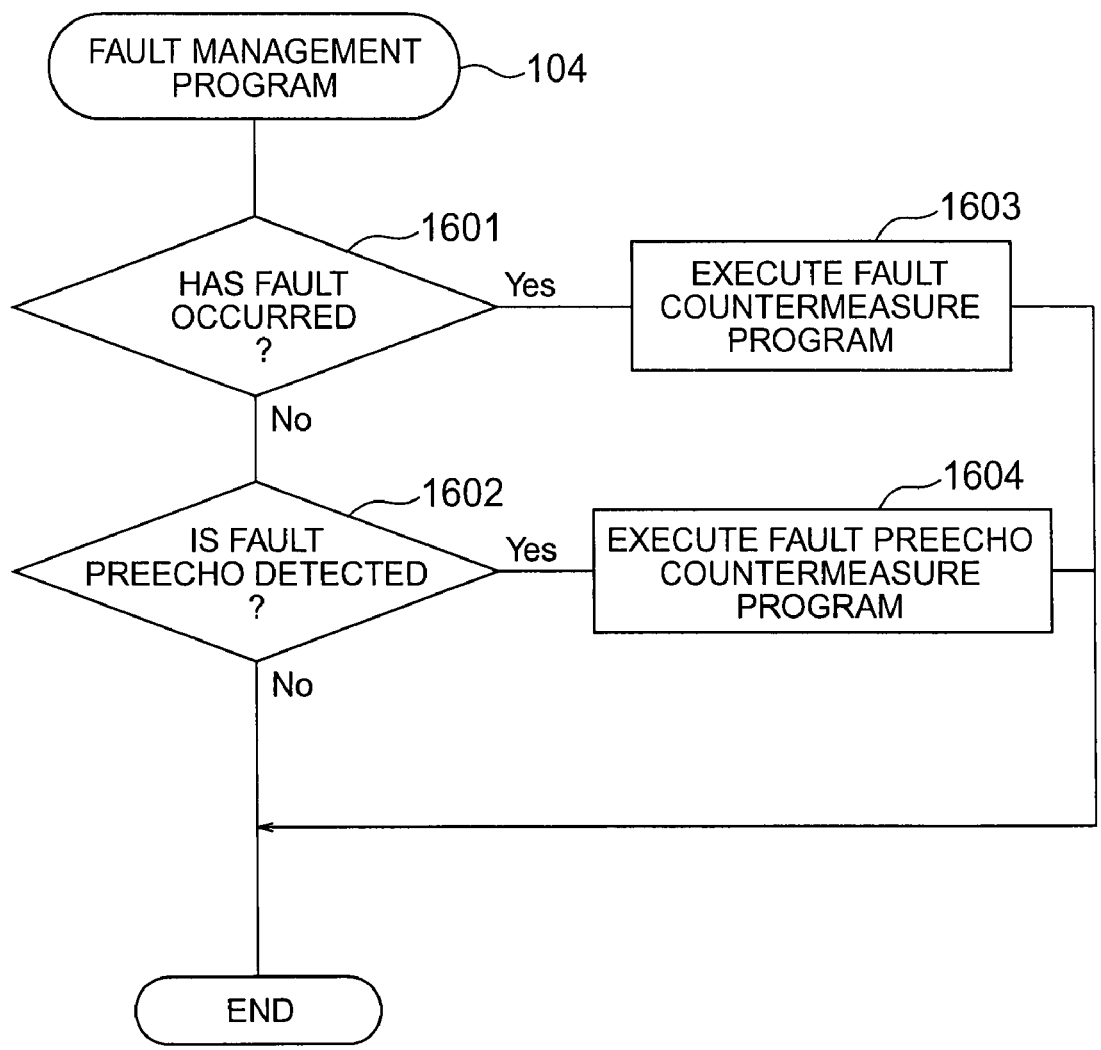
FIG. 16 shows a flow chart of a fault management program.

FIG. 16 shows a flow chart of the fault management program 104. At step 1601 in the fault management program 104, a decision is made whether a fault has occurred. The decision can be made by referring to the processor management table 110. At step 1602, a decision is made whether a fault preecho has been detected. The decision can also be made by referring to the processor management table 110 in the same way as the step 1601. If a fault has occurred, the processing proceeds to step 1603 and a fault countermeasure program is executed. If a fault preecho is detected, the processing proceeds to step 1604 and a fault preecho countermeasure program is executed.

Figure 17:
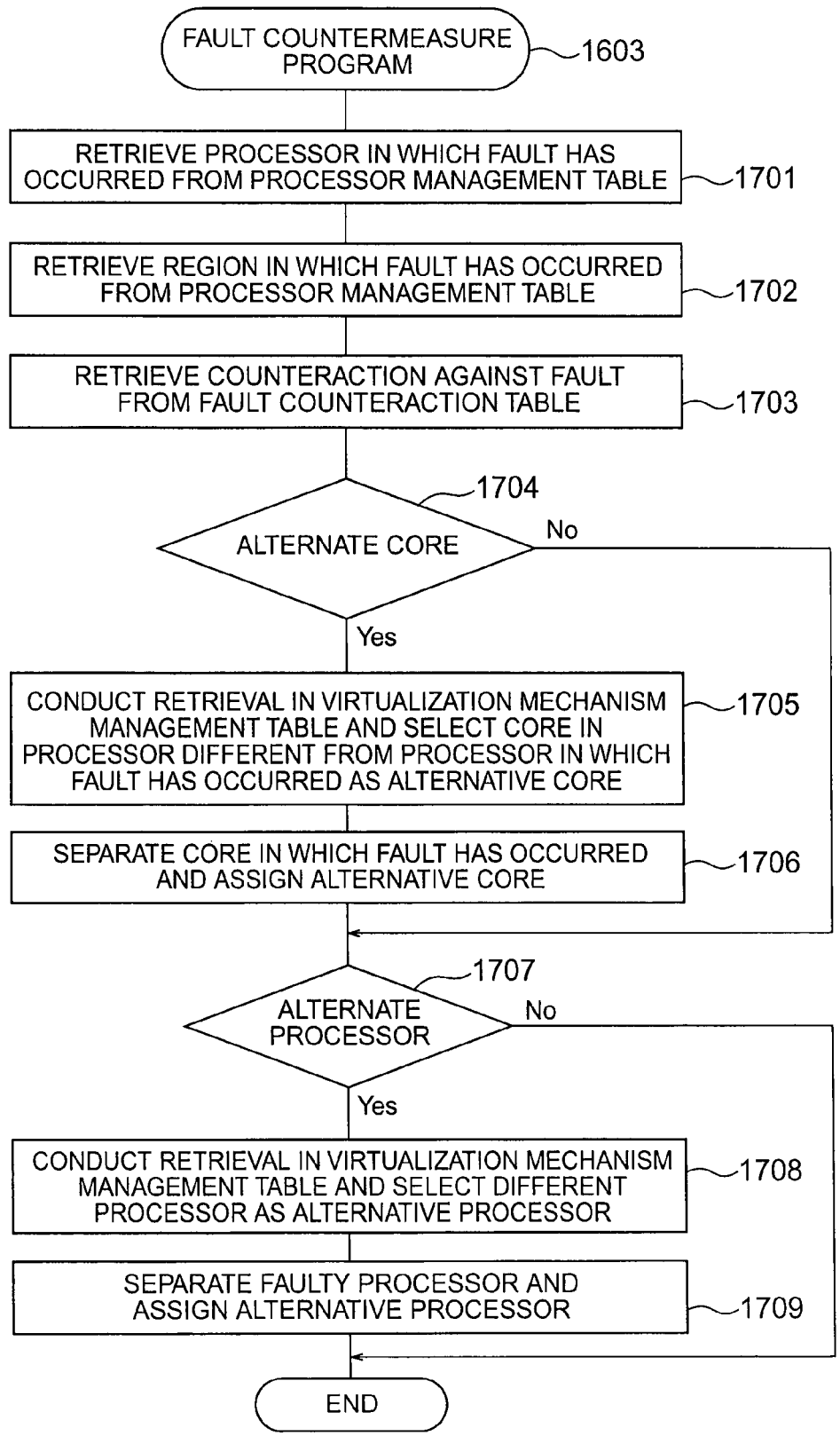
FIG. 17 shows a flow chart of a fault countermeasure program.

FIG. 17 shows a flow chart of the fault countermeasure program 1603. A processor or core in which a fault has occurred is basically alternated with another processor or core. At step 1701 in the fault countermeasure program 1603, a processor in which a fault has occurred is retrieved from the processor management table 110. At step 1702, a region in which the fault has occurred is retrieved from the processor management table 110. At step 1703, the fault counteraction table 111 is referred to, and processing corresponding to the fault region is retrieved. At step 1704, a decision is made whether the fault counteraction is core alternation. If the fault counteraction is core alternation, the processing proceeds to step 1705. At the step 1705, retrieval is conducted in the virtualization mechanism management table 109, and a core in a processor that is different from the processor in which the fault has occurred is selected as an alternative core. At step 1706, the faulty core is separated from the virtual server, and the alternative core selected at the step 1705 is assigned. At step 1707, a decision is made whether the fault counteraction is processor alternation. If the fault counteraction is processor alternation, the processing proceeds to step 1708. At the step 1708, retrieval is conducted in the virtualization mechanism management table 109, and a different processor is selected as an alternative core. At step 1709, the faulty processor is separated, and the alternative processor is assigned. Owing to the processing heretofore described, the virtual server that has been assigned to the faulty core or processor can be restored to the normal state.

Figure 18:
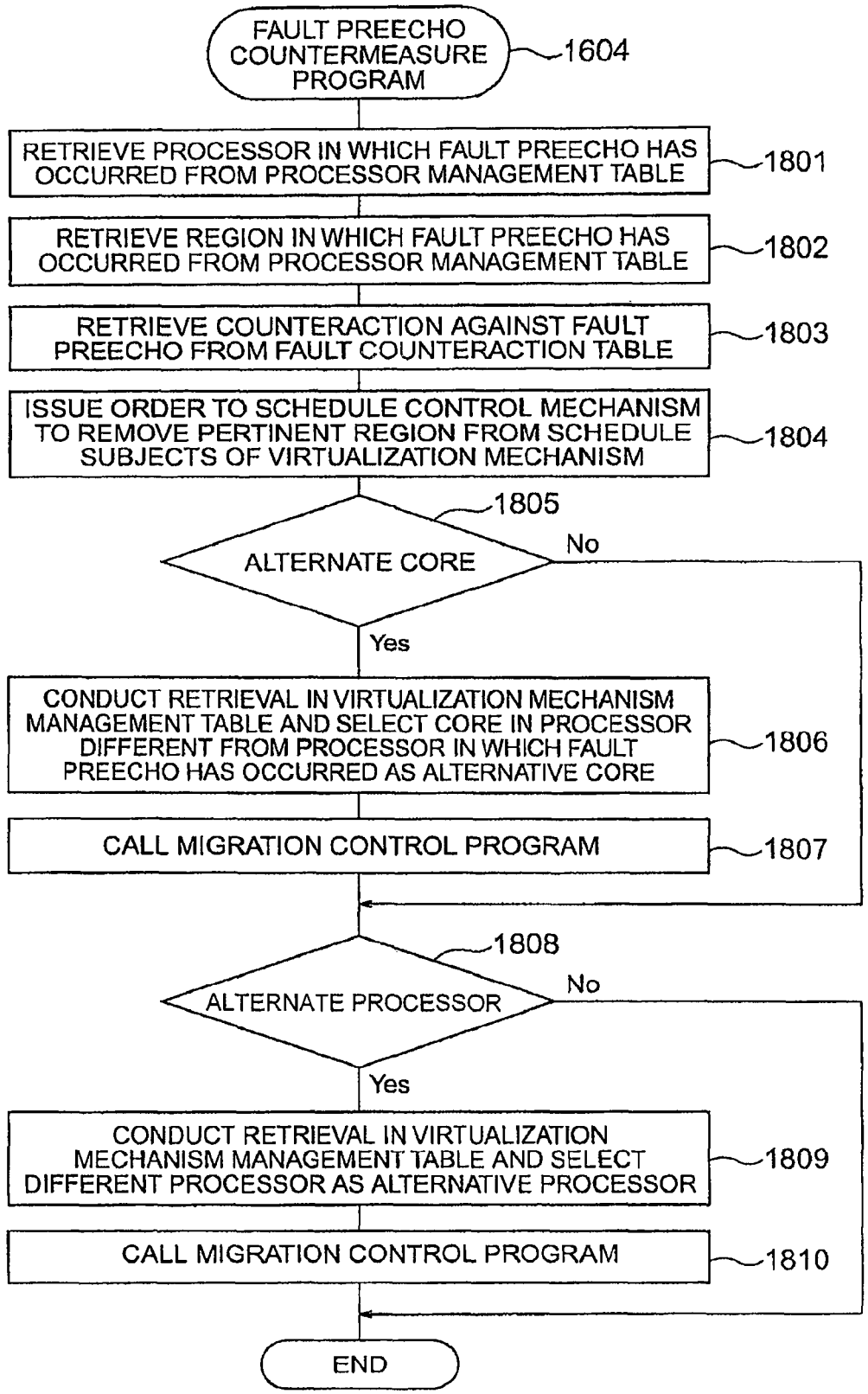
FIG. 18 shows a flow chart of a fault preecho countermeasure program.

FIG. 18 shows a flow chart of the fault preecho countermeasure program 1604. A processor or core in which a fault preecho is detected is basically alternated with another processor or core. At step 1801 in the fault preecho countermeasure program 1604, a processor in which a fault preecho is detected is retrieved from the processor management table 110. At step 1802, a region in which the fault preecho has occurred is retrieved from the processor management table 110. At step 1803, the fault counteraction table 111 is referred to, and processing corresponding to the fault preecho region is retrieved. At step 1804, an order is issued to the schedule control mechanism 301 to remove the region from an execution schedule subject of the virtualization mechanism 115. This aims at protecting the virtualization mechanism 115 from a fault that might occur in the future. Since the virtualization mechanism 115 might affect the whole system including the generated virtual server, the virtualization mechanism 115 is a subject to be protected preferentially in the system. The reliability of the whole system can be improved by removing the processor or core in which a fault preecho has been detected from the schedule subject at the step 1804. At step 1805, a decision is made whether the fault preecho counteraction is core alternation. If the fault preecho counteraction is core alternation, the processing proceeds to step 1806. At the step 1806, retrieval is conducted in the virtualization mechanism management table 109, and a core in a processor that is different from the processor in which the fault preecho is detected is selected as an alternative core. At step 1807, migration control program calling is conducted. The migration is processing for preventing the core alternation from affecting the system. At step 1808, a decision is made whether the fault preecho counteraction is processor alternation. If the fault preecho counteraction is processor alternation, the processing proceeds to step 1809. At the step 1809, retrieval is conducted in the virtualization mechanism management table 109, and a different processor is selected as an alternative core. At step 1810, migration control program calling is conducted. Owing to the processing heretofore described, the virtual server that has been assigned to the faulty core or processor can be restored to the normal state without affecting the system.

Figure 19:
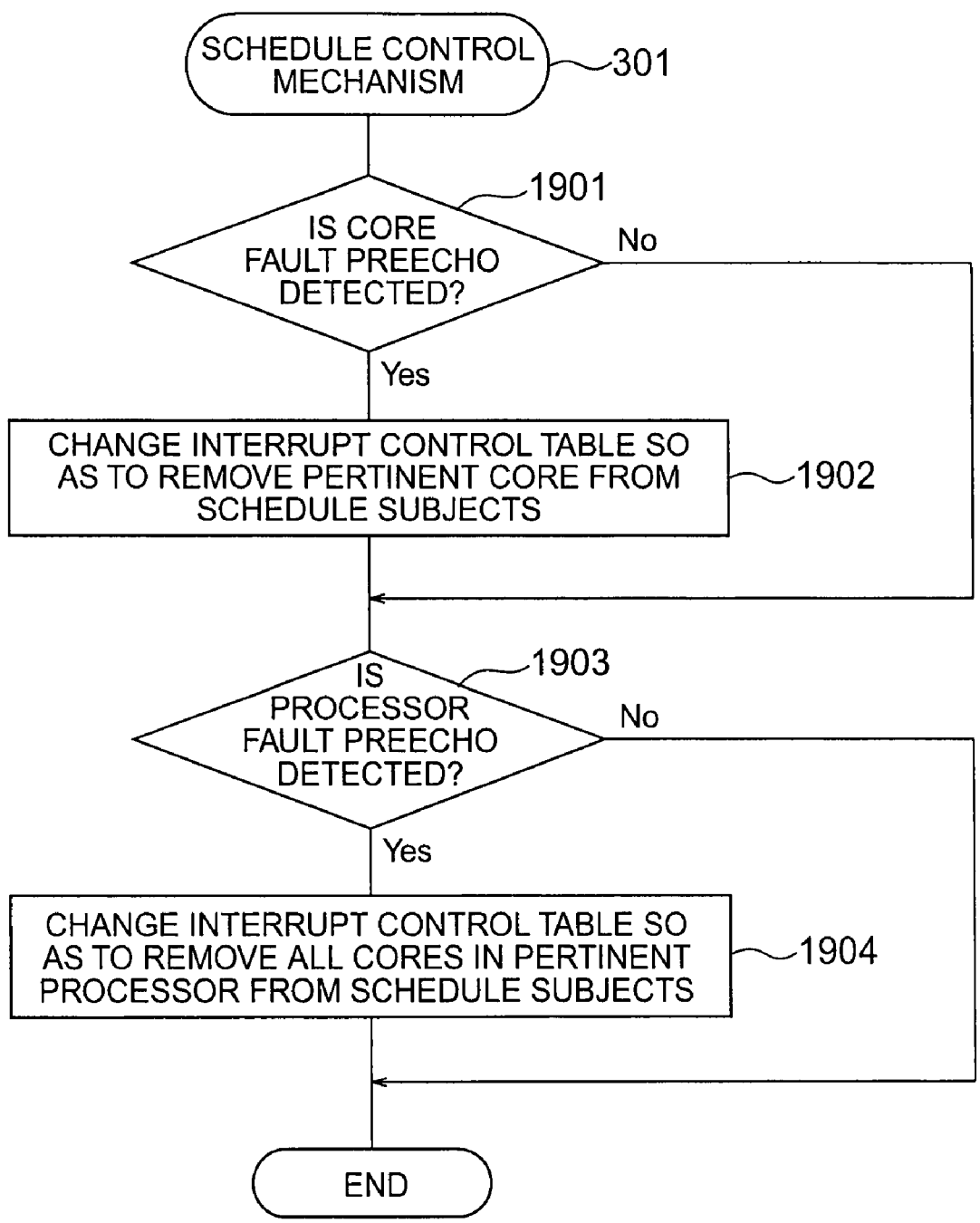
FIG. 19 shows a flow chart of a schedule control mechanism.

FIG. 19 shows a flow chart of the schedule control mechanism 301. At step 1901 in the schedule control mechanism 301, a decision is made whether a core fault preecho has been detected. If a core fault preecho has been detected, the processing proceeds to step 1902. At the step 1902, the interrupt control table 304 is changed so as to remove the pertinent core from the schedule subjects. At step 1901 in the schedule control mechanism 301, a decision is made whether a core fault preecho has been detected. If a core fault preecho has been detected, the processing proceeds to step 1902. At the step 1902, the interrupt control table 304 is changed so as to remove the pertinent core from the schedule subjects. At step 1903, a decision is made whether a fault preecho that affects the whole processor has been detected. For example, a decision is made whether a fault preecho in the secondary cache or the memory bus shared by a plurality of cores has been detected. If a fault preecho that affects the whole processor is detected, the interrupt control table 304 is changed so as to remove all cores in the pertinent processor from the schedule subjects.

FIG. 20 shows the interrupt control table 304. In a column 2001, a processor ID is stored. In a column 2002, interrupt enabled/disabled depending upon the interrupt level is stored. As for the interrupt level, the number of levels and meaning differ depending upon the processor architecture. If a fault preecho is detected, however, the interrupt is changed to disabled with the object of protecting the programs. As a result, programs that affect the whole system such as the virtualization mechanism 115 can be protected. In general, a program executed by a processor is executed in a core in a processor that has accepted the interrupt. If a fault has not occurred in a core or a processor, generated interrupts are distributed so as to execute programs in a plurality of cores equally. If a fault preecho is detected, however, there is a possibility that a fault will occur in the near future. Therefore, it is necessary to protect especially a reliability-weighted program such as the virtualization mechanism 115. Accordingly, the core or processor in which the fault preecho is detected is removed from the execution schedule by making the interrupt disabled. In FIG. 20, for example, the interrupt is set to disabled for a core 1 in a processor 1 in which a core fault preecho has been detected. For a processor 2 in which a fault preecho that affects the whole processor has been detected, the interrupt is set to disabled for all cores.

Figure 21:
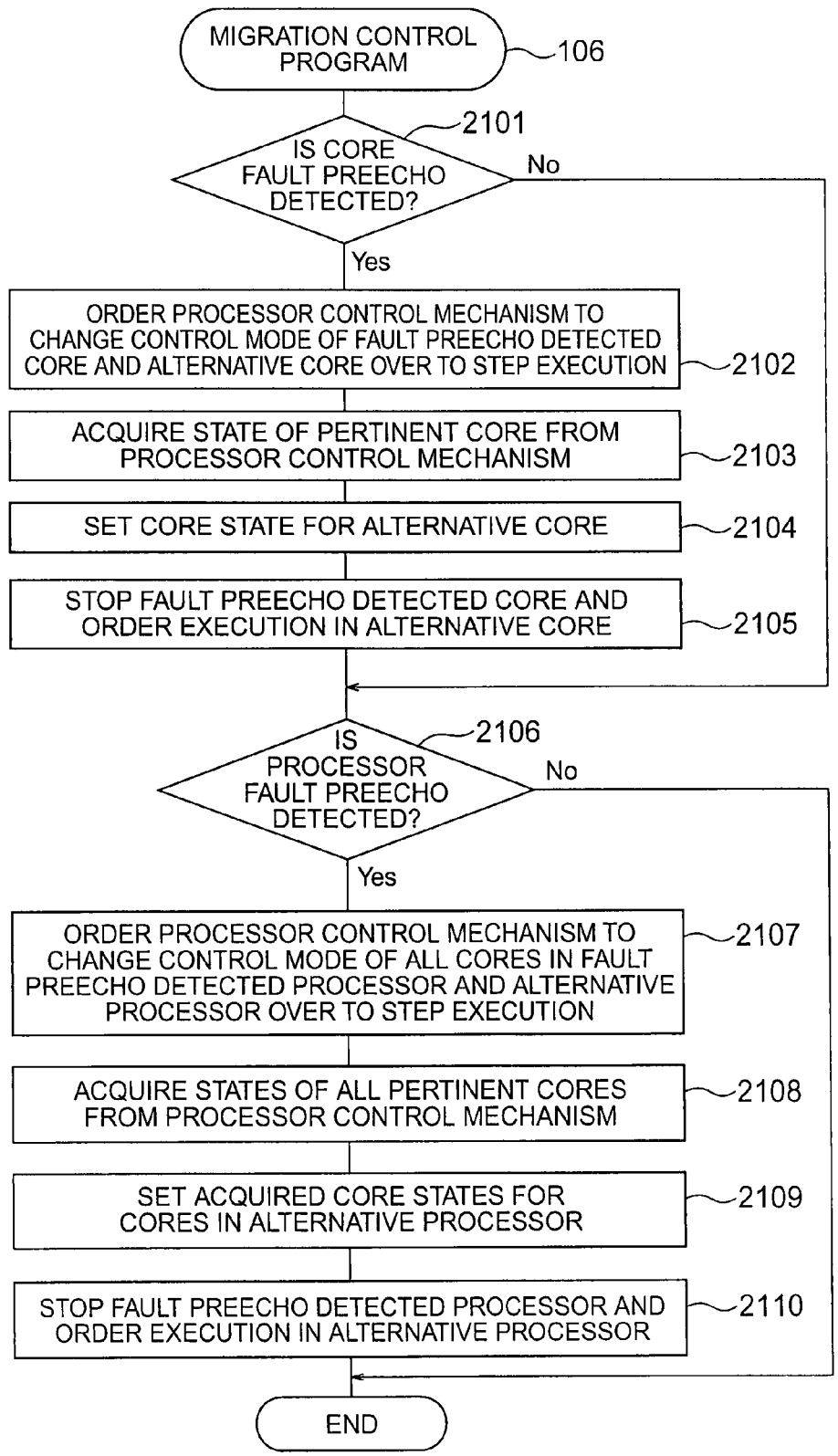
FIG. 21 shows a flow chart of a migration control program.

FIG. 21 shows a flow chart of the migration control program 106. At step 2101 in the migration control program 106, a decision is made whether a core fault preecho has been detected. If a core fault preecho has been detected, the processing proceeds to step 2102. At the step 2102, the processor control mechanism 303 is ordered to change the control mode of a fault preecho detected core and an alternative core over to step execution. This aims at accurately grasping how far instructions have been executed by changing the processor execution mode to the step execution. In the ordinary execution mode, a plurality of instructions are executed simultaneously in a core, and consequently a decision cannot be made how far instructions have been executed. Therefore, the processor is temporarily shifted to the step execution mode, and operation at the instruction level in the processor is managed from the outside. The reason why the alternative core is shifted to the step execution mode is that the execution is controlled from the outside. At step 2103, the state of the pertinent core is acquired from the processor control mechanism 303. Here, the state is information required to shift the control to the alternative core smoothly. For example, the information is contents of a control register storing an instruction execution address such as a program counter. At step 2104, the core state is set in the alternative core. At step 2105, the core in which the fault preecho has been detected is stopped and execution in the alternative core is ordered. As a result, shift to the alternative core can be achieved without affecting the system. At step 2106, a decision is made whether a processor fault preecho has been detected. If a processor fault preecho has been detected, the processing proceeds to step 2107. At the step 2107, the processor control mechanism 303 is ordered to change the control mode of all cores in the fault preecho detected processor and the alternative processor over to the step execution. At step 2108, states of all pertinent cores are acquired from the processor control mechanism 303. At step 2109, the core states acquired at the step 2108 are set for cores in the alternative processor. At step 2110, the fault preecho detected processor is stopped and execution in the alternative processor is ordered. As a result, the migration of the whole processor becomes possible without affecting the system.

Figure 22:
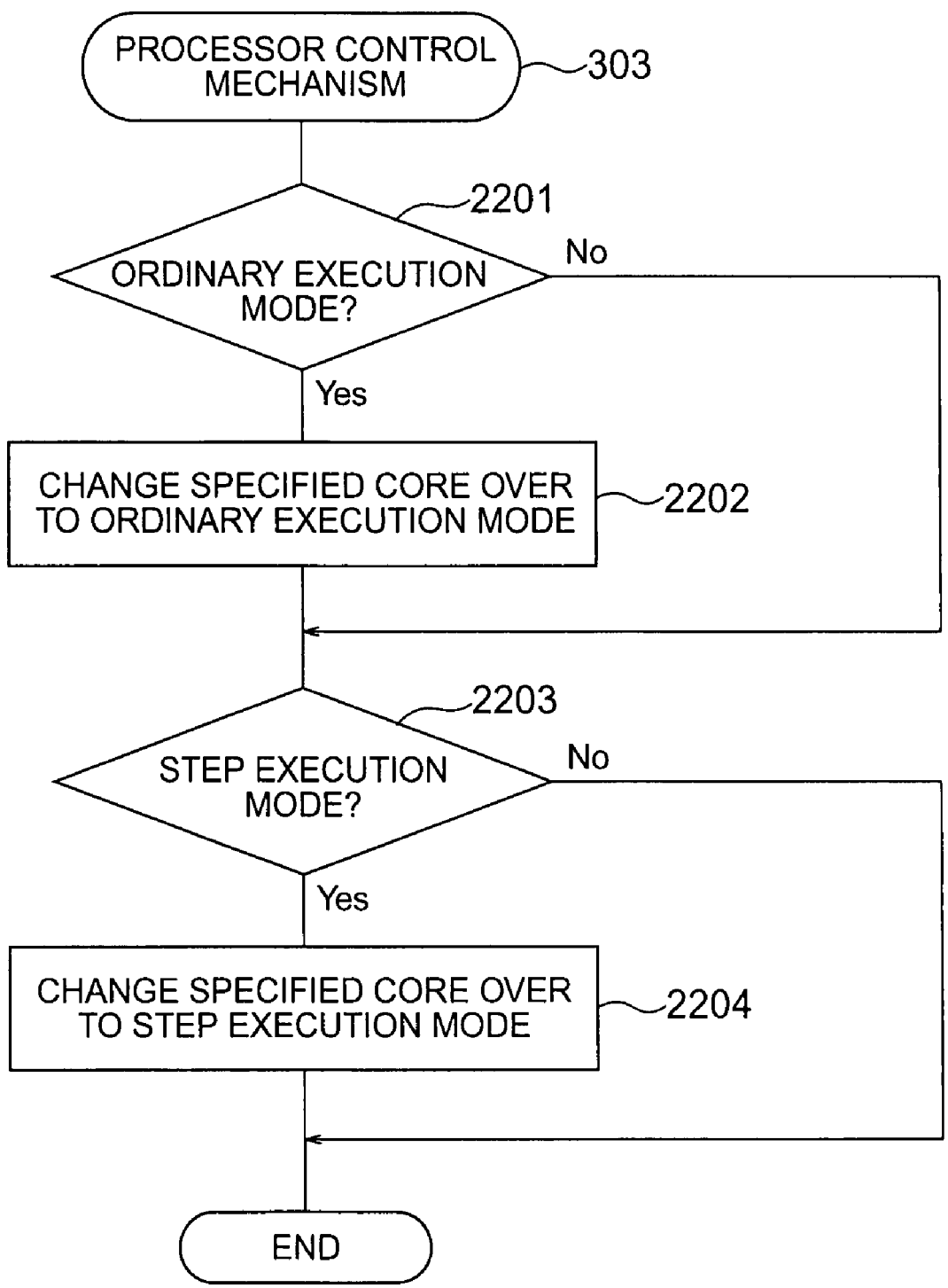
FIG. 22 shows a flow chart of a processor control mechanism.

FIG. 22 shows a flow chart of the processor control mechanism 303. At step 2201 in the processor control mechanism 303, a decision is made whether a change to the ordinary execution mode is ordered. If a change to the ordinary execution mode is ordered, the processing proceeds to step 2202. At the step 2202, a specified core is changed over to the ordinary execution mode. At step 2203, a decision is made whether changeover to the step execution mode is ordered. If changeover to the step execution mode is ordered, the specified core is changed over to the step execution mode.

According to the first embodiment described above, a fault is previously avoided by detecting a fault preecho in a processor. Even if a fault occurs, cores in a plurality of processors are assigned to a single virtual server. As a result, the reliability can be improved. In addition, it becomes possible to use processors efficiently by providing reliability-weighted and performance-weighted and controlling assignment of cores to virtual servers as the user interface.

In the present first embodiment, the virtualization mechanism management program 102 and various tables are stored in the memory 2901 in the management server 101. Alternatively, the virtualization mechanism management program 102 and various tables may be stored in the memory 113 in the server apparatus 112. For example, as one of methods for disposing the virtualization mechanism management program 102 and various tables in the server apparatus 112, the virtualization mechanism management program 102 and various tables in the management server 101 may be disposed in one of the virtual servers 114.

In the present first embodiment, assignment of the processor cores 116 is conducted by using the virtualization mechanism 115. However, the virtualization mechanism 115 is not always necessary. For example, even when a single operating system conducts multi-core assignment, the present invention can be applied. For example, the present invention can be applied to a program execution environment such as a process or a thread of the operation system. In another example, the present invention can be applied even when the operating system generates an environment in which a plurality of different operating systems can be executed.

2. Second Embodiment

Figure 23:
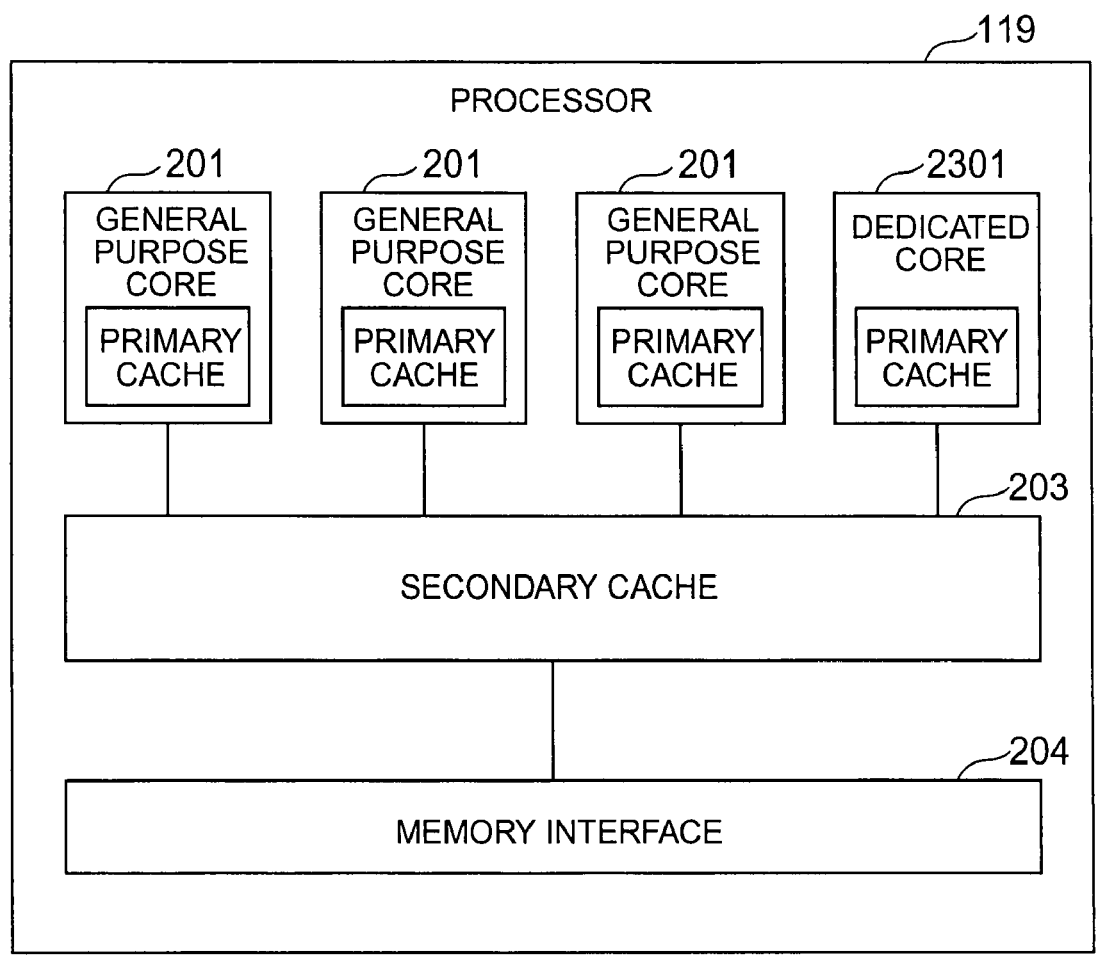
FIG. 23 shows a configuration of a processor including different cores in a second embodiment.

FIG. 23 shows a configuration of a processor according to a second embodiment of the present invention. The cores in the first embodiment are general purpose cores in the second embodiment. A management method in a processor 119 having not only cores of the same kind but also cores of a different kind mounted thereon will now be described in the second embodiment. A great difference is in that a dedicated core 2301 is mounted on the processor 119. The dedicated core 2301 means a core with the object of improving the speed in specific processing. For example, speed increase in floating-point arithmetic operation or speed increase in character string processing is conceivable.

FIG. 24 shows a configuration of the fault counteraction table 111 in the second embodiment. Unlike the first embodiment, an item of dedicated core is added to the processor region in the column 802.1n the second embodiment, the dedicated core is less in number than the general purpose cores. Therefore, the priority order of the dedicated core against a fault is set to be higher than the general purpose cores. In other words, since a fault in a core of a kind having a smaller number exerts greater influence upon the system, the core of the kind is set so as to take preference in alternation. In the second embodiment, an example in which the general purpose core is greater in number than the dedicated core is exhibited. However, the opposite case is also conceivable. The present invention has a feature that cores having a smaller number are provided with higher alternation priority regardless of whether the cores are dedicated cores or general purpose cores. If cores of different kinds are mounted, the core management method of the virtual server is also different in this way.

Figure 25:
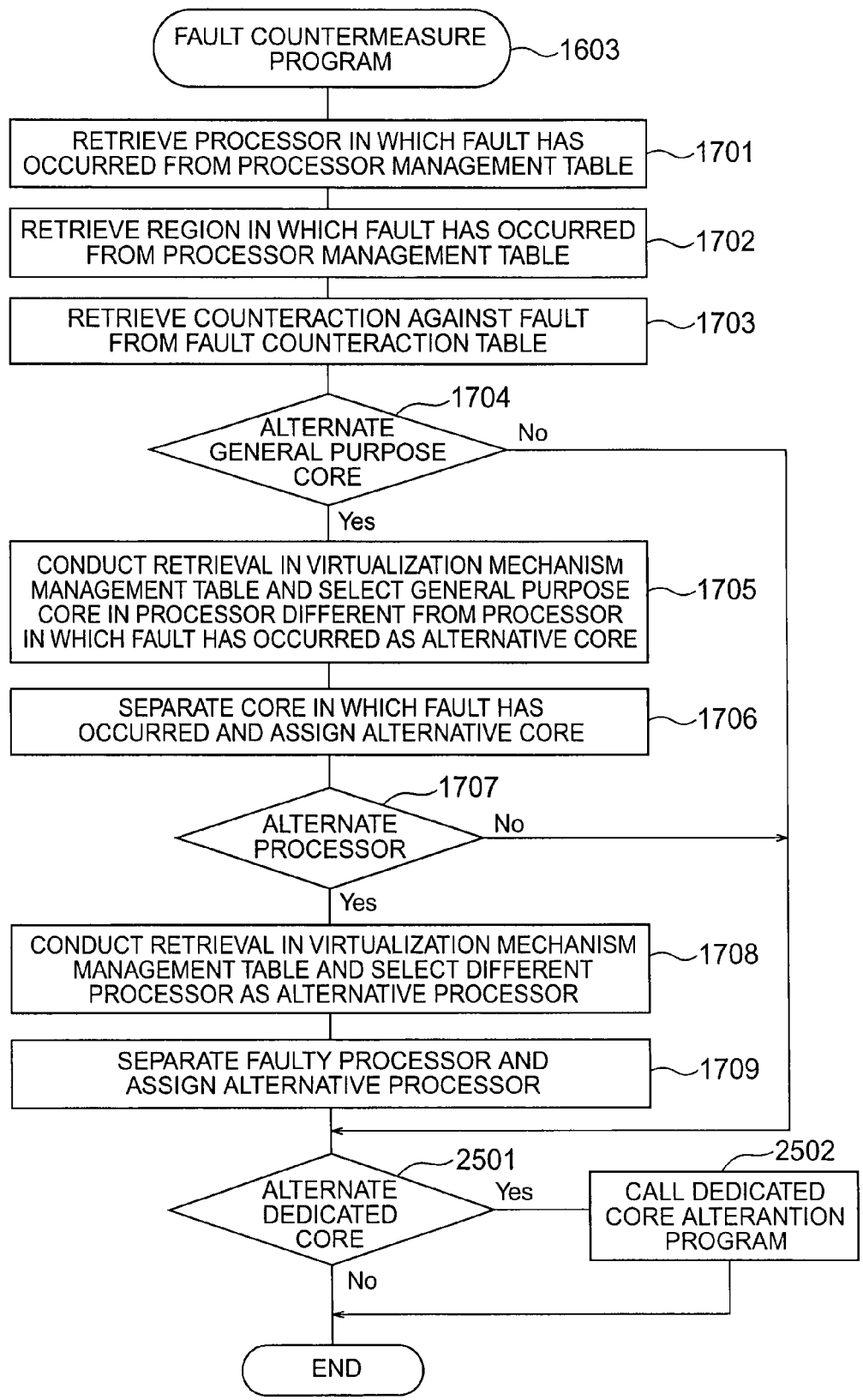
FIG. 25 shows a flow chart of a fault countermeasure program in the second embodiment.

FIG. 25 shows a flow chart of the fault countermeasure program 1603 in the second embodiment. A processor or core in which a fault has occurred is basically alternated with another processor or core. At step 1701 in the fault countermeasure program 1603 in the second embodiment, a processor in which a fault has occurred is retrieved from the processor management table 110. At step 1702, a region in which the fault has occurred is retrieved from the processor management table 110. At step 1703, the fault counteraction table 111 is referred to, and processing corresponding to the fault region is retrieved. At step 1704, a decision is made whether the fault counteraction is core alternation. If the fault counteraction is core alternation, the processing proceeds to step 1705. At the step 1705, retrieval is conducted in the virtualization mechanism management table 109, and a core in a processor that is different from the processor in which the fault has occurred is selected as an alternative core. At step 1706, the faulty core is separated from the virtual server, and the alternative core selected at the step 1705 is assigned. At step 1707, a decision is made whether the fault counteraction is processor alternation. If the fault counteraction is processor alternation, the processing proceeds to step 1708. At the step 1708, retrieval is conducted in the virtualization mechanism management table 109, and a different processor is selected as an alternative core. At step 1709, the faulty processor is separated, and the alternative processor is assigned. At step 2501, a decision is made whether the alternation is alternation of the dedicated core. If the alternation is alternation of the dedicated core, the processing proceeds to step 2502. At the step 2502, a dedicated core alternation program is called. Owing to the processing heretofore described, the virtual server that has been assigned to the faulty core or processor can be restored to the normal state.

Figure 26:
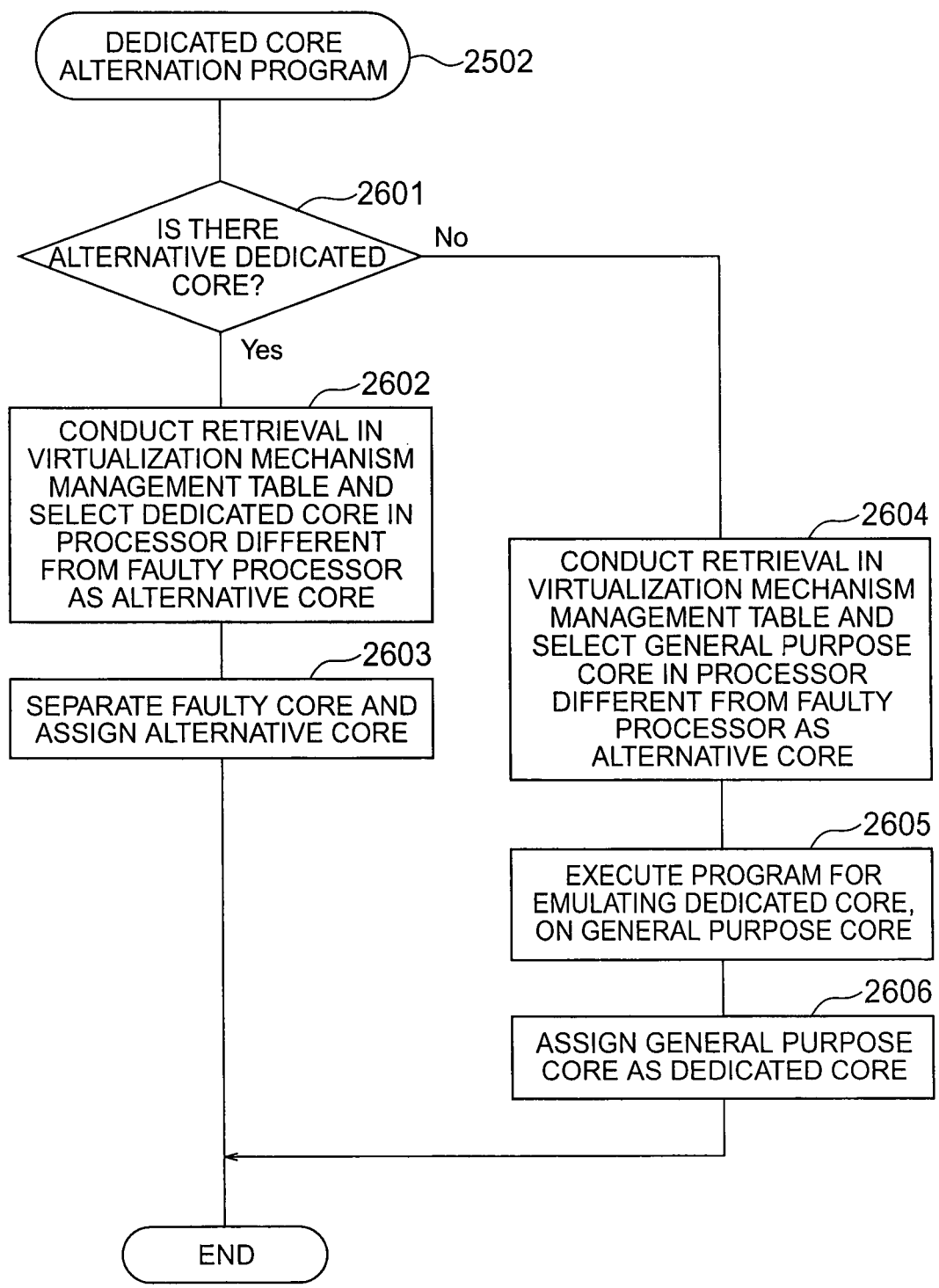
FIG. 26 shows a flow chart of a dedicated core alternation program in the second embodiment.

FIG. 26 shows a flow chart of the dedicated core alternation program 2502. At step 2601 in the dedicated core alternation program 2502, a decision is made whether there is a dedicated core for alternation. If there is an alternative core, the processing proceeds to step 2602. At the step 2602, retrieval is conducted in the virtualization mechanism management table 109 and a core in a processor different from a processor in which a fault has occurred is selected. Here, the core means a dedicated core. At step 2603, the faulty core is separated and the alternative core is assigned. On the other hand, if there is not an alternative core, the processing proceeds to step 2604. At the step 2604, retrieval is conducted in the virtualization mechanism 109 and a general purpose core in a processor different from the processor in which the fault has occurred is selected. At step 2605, a program for emulating the function of the dedicated core is executed on the general purpose core to alternate the dedicated core. Owing to the processing described heretofore, the processing can be continued without stopping the system by emulating a core that is small in number with a general purpose core. Similar processing can also be applied to operation conducted when a fault preecho is detected.

Figure 27:
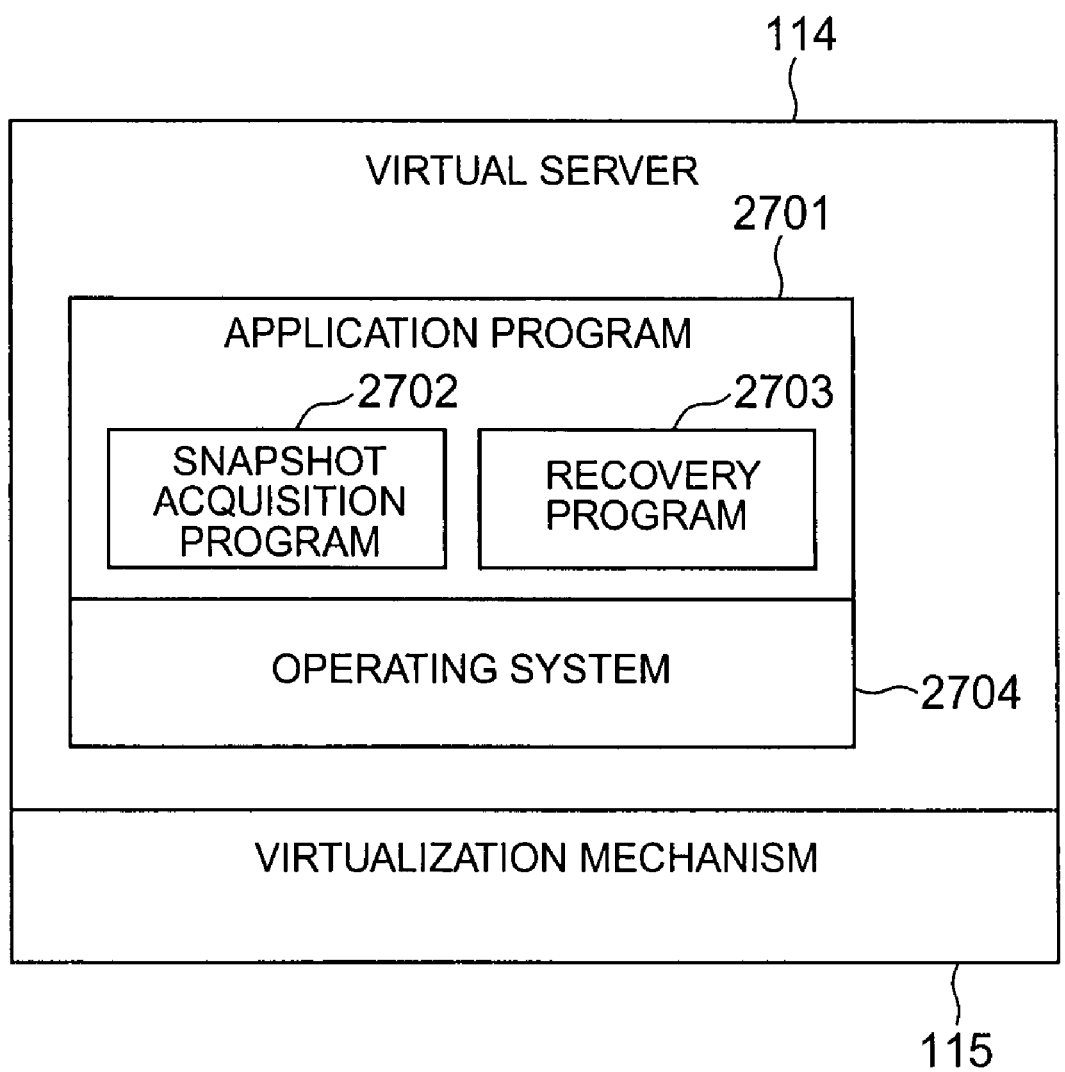
FIG. 27 shows a recovery configuration of an application program in the second embodiment.

FIG. 27 shows an example of recovery of an application program conducted when a fault has occurred in a processor or a core in a processor. In a virtual server 114, an operating system 2704 is operating and an application program 2701 is being executed on the operating system 2704. The application program includes a snapshot acquisition program 2702 and a recovery program 2703. The snapshot acquisition program 2702 has a function of periodically recording an operation state of the application. This aims at making re-execution possible when a fault has occurred. For example, an execution result of the application program is recorded. If a fault has occurred in a processor or a core, the recovery program 2703 reads a state acquired by the snapshot acquisition program 2702, and the execution of the application program 2701 is resumed. As a result, the object can be accomplished.

3. Third Embodiment

FIG. 28 shows the server configuration table 108 in a third embodiment. It differs from the first embodiment in that a column 2801 is added. The column 2801 means that virtualization mechanisms cooperate with each other. Since virtualization mechanisms cooperate with each other although they are different in system ID, a plurality of systems can look as if they form a single system. In FIG. 28, it is meant that a virtualization mechanism 1 and a virtualization mechanism 2 are cooperating. In such a case, the subject of alternation can be expanded when a fault preecho or a fault has been detected. For example, if a fault has occurred in a processor ID 1 belonging to the virtualization mechanism 1, a core owned by a processor 3 can be selected as a subject of alternation. It becomes possible to improve the reliability and availability of the system owing to this cooperation.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. In a virtualization environment in which a virtualization mechanism for generating and controlling a virtual server operates in a server including a plurality of multi-core processors each having a plurality of arithmetic cores and the virtualization mechanism is managed by a management server, a multi-core processor controlling method, wherein:
the management server includes:
arithmetic core management information which includes correspondence information between a multi-core processor and an arithmetic core, and state information indicating any fault preecho detected in the multi-core processor or the arithmetic core, and
virtualization mechanism management information which indicates correspondence between an arithmetic core which is not assigned to any virtual server and a multi-core processor having the unassigned arithmetic core, and correspondence between an arithmetic core assigned to a virtual server and a multi-core processor having the assigned arithmetic core; and
the virtualization mechanism includes:
a fault preecho detection mechanism for detecting a fault preecho in a multi-core processor, and
a schedule control mechanism for changing a use schedule of a multi-core processor or an arithmetic core to prevent use of the multi-core processor or the arithmetic core,
when the management server generates a new virtual server, the management server performs method steps comprising:
selecting a plurality of different multi-core processors each having an arithmetic core which is not assigned to any virtual server based on the arithmetic core management information and the virtualization mechanism management information; and
issuing a first order to the virtualization mechanism for assigning the unassigned arithmetic cores owned by the selected multi-core processors to the new virtual server, and
when the fault preecho detection mechanism detects a fault preecho in a multi-core processor or an arithmetic core, the management server performs a method step comprising issuing a second order to the schedule control mechanism to change an execution schedule such that no virtual server is executed on the multi-core processor or the arithmetic core in which the fault preecho is detected.

2. The multi-core processor controlling method according to claim 1, wherein the virtualization mechanism management information interrelates the virtualization mechanism, a virtual server, a multi-core processor assigned to the virtualization mechanism, and an arithmetic core.

3. The multi-core processor controlling method according to claim 1, wherein the arithmetic core management information interrelates a multi-core processor, an arithmetic core, and status information with respect to the arithmetic core.

4. A system including a virtualization mechanism for generating and controlling a virtual server operates in a server including a plurality of multi-core processors each having a plurality of arithmetic cores and the virtualization mechanism is managed by a management server, wherein:
the management server includes:
arithmetic core management information which includes correspondence information between a multi-core processor and an arithmetic core, and state information indicating any fault preecho detected in the multi-core processor or the arithmetic core, and
virtualization mechanism management information which indicates correspondence between an arithmetic core which is not assigned to any virtual server and a multi-core processor having the unassigned arithmetic core, and correspondence between an arithmetic core assigned to a virtual server and a multi-core processor having the assigned arithmetic core;
the virtualization mechanism includes:
a fault preecho detection mechanism for detecting a fault preecho in a multi-core processor, and
a schedule control mechanism for changing a use schedule of a multi-core processor or an arithmetic core to prevent use of the multi-core processor or the arithmetic core;
when the management server generates a new virtual server, the management server:
selects a plurality of different multi-core processors each having an arithmetic core which is not assigned to any virtual server based on the arithmetic core management information and the virtualization mechanism management information, and
issues a first order to the virtualization mechanism for assigning the unassigned arithmetic cores owned by the selected multi-core processors to the new virtual server; and
when the fault preecho detection mechanism detects a fault preecho in a multi-core processor or an arithmetic core, the management server issues a second order to the schedule control mechanism to change an execution schedule such that no virtual server is executed on the multi-core processor or the arithmetic core in which the fault preecho is detected.

5. The system according to claim 4, wherein the virtualization mechanism management information interrelates the virtualization mechanism, a virtual server, a multi-core processor assigned to the virtualization mechanism, and an arithmetic core.

6. The system according to claim 4, wherein the arithmetic core management information interrelates a multi-core processor, an arithmetic core, and status information with respect to the arithmetic core.

7. In a virtualization environment in which a virtualization mechanism for generating and controlling a virtual server operates in a server including a plurality of multi-core processors each having a plurality of arithmetic cores and the virtualization mechanism is managed by a management server, a non-transitory computer-readable medium encoded with a program executable by a computer, the program upon execution causing the computer to function as:
the management server including:
arithmetic core management information which includes correspondence information between a multi-core processor and an arithmetic core, and state information indicating any fault preecho detected in the multi-core processor or the arithmetic core, and
virtualization mechanism management information which indicates correspondence between an arithmetic core which is not assigned to any virtual server and a multi-core processor having the unassigned arithmetic core, and correspondence between an arithmetic core assigned to a virtual server and a multi-core processor having the assigned arithmetic core;

the virtualization mechanism including:
- a fault preecho detection mechanism for detecting a fault preecho in a multi-core processor, and
- a schedule control mechanism for changing a use schedule of a multi-core processor or an arithmetic core to prevent use of the multi-core processor or the arithmetic core;

when the management server generates a new virtual server, the management server:
- selects a plurality of different multi-core processors each having an arithmetic core which is not assigned to any virtual server based on the arithmetic core management information and the virtualization mechanism management information, and
- issues a first order to the virtualization mechanism for assigning the unassigned arithmetic cores owned by the selected multi-core processors to the new virtual server; and when the fault preecho detection mechanism detects a fault preecho in a multi-core processor or an arithmetic core, the management server issues a second order to the schedule control mechanism to change an execution schedule such that no virtual server is executed on the multi-core processor or the arithmetic core in which the fault preecho is detected.

8. The non-transitory computer-readable medium according to claim 7, wherein the virtualization mechanism management information interrelates the virtualization mechanism, a virtual server, a multi-core processor assigned to the virtualization mechanism, and an arithmetic core.

9. The non-transitory computer-readable medium according to claim 7, wherein the arithmetic core management information interrelates a multi-core processor, an arithmetic core, and status information with respect to the arithmetic core.

* * * * *